(12) United States Patent
Gast et al.

(10) Patent No.: US 6,367,903 B1
(45) Date of Patent: Apr. 9, 2002

(54) ALIGNMENT OF INK DOTS IN AN INKJET PRINTER

(75) Inventors: Paul D. Gast, Camas, WA (US); James L. McCullough, San Diego, CA (US); Albert Serra; Xavier Gros, both of Barcelona (ES); Jose J Doval, Escondido, CA (US); Stefano Schiaffino, Menlo Park, CA (US); Ronald A. Askeland, San Diego, CA (US); Clayton L. Holstun, San Marcos, CA (US); Scott Norum, La Jolla, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/199,882

(22) Filed: Nov. 24, 1998

Related U.S. Application Data

(63) Continuation-in-part of application No. 08/796,835, filed on Feb. 6, 1997.

(51) Int. Cl.$^7$ .......................... B41J 29/38; B41J 29/393
(52) U.S. Cl. ............................................. 347/9; 347/19
(58) Field of Search ................................ 347/9, 19, 78

(56) References Cited

U.S. PATENT DOCUMENTS

| | | | | |
|---|---|---|---|---|
| 5,083,137 A | * | 1/1992 | Badyal et al. | |
| 5,250,956 A | * | 10/1993 | Haselby et al. | |
| 5,610,635 A | * | 3/1997 | Murray et al. | 347/7 |
| 5,751,305 A | * | 5/1998 | Hadley | 347/19 |
| 5,835,108 A | * | 11/1998 | Beauchamp et al. | 347/19 |
| 6,042,213 A | * | 3/2000 | Hayasaki | 347/19 |
| 6,076,915 A | * | 6/2000 | Gast et al. | 347/19 |

* cited by examiner

Primary Examiner—John Barlow
Assistant Examiner—Alfred E. Dudding
(74) Attorney, Agent, or Firm—Skjerven Morrill MacPherson LLP; Brian D. Ogonowsky

(57) ABSTRACT

A misalignment compensation technique for a dot printer is disclosed. This technique first supplies printing instructions to a printhead for energizing printing elements in various groups (primitives) to print a pattern on a medium. The printed pattern is then detected by optical sensors in the printer. Based on the detection, a position offset error for each primitive is determined. These errors are used to generate a separate time correction for each of the primitives such that, when the printer is used normally, the time period for printing a dot will be advanced or delayed for each primitive so as to align the dots printed by the primitives. In another embodiment, alignment data taken by a manufacturing line sensor is stored in a memory on the print cartridge. After the print cartridge is installed in the printer, a second optical test completes the data needed to create timing correction values.

4 Claims, 22 Drawing Sheets

IDEAL

ACTUAL

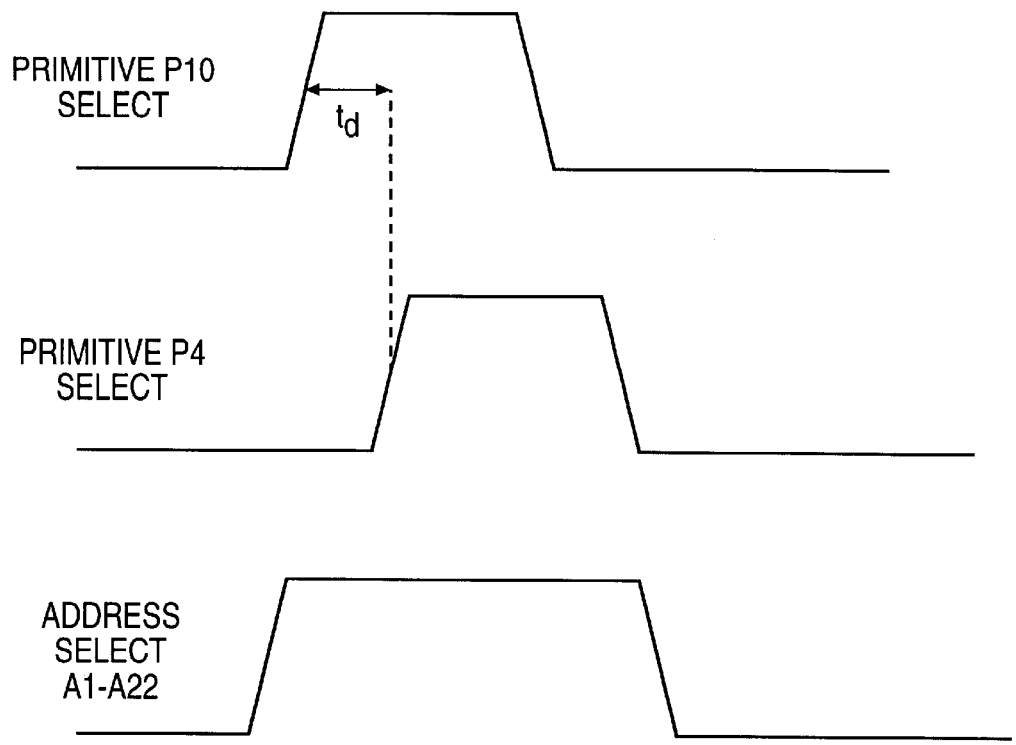
FIG. 14
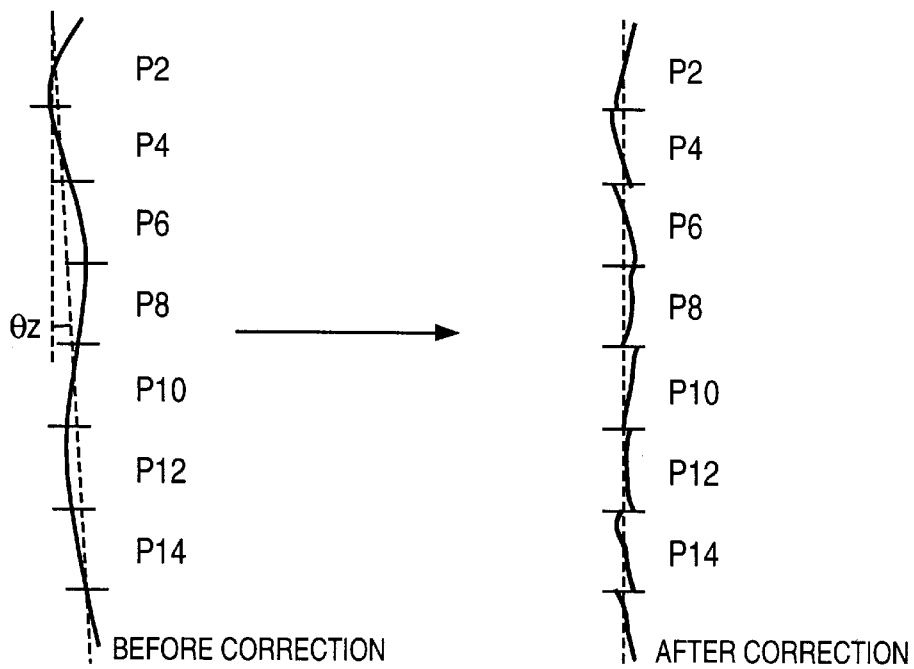
FIG. 15A
(PRIOR ART)
FIG. 15B

Uncorrected Line

Full Compensation

Limited Compensation

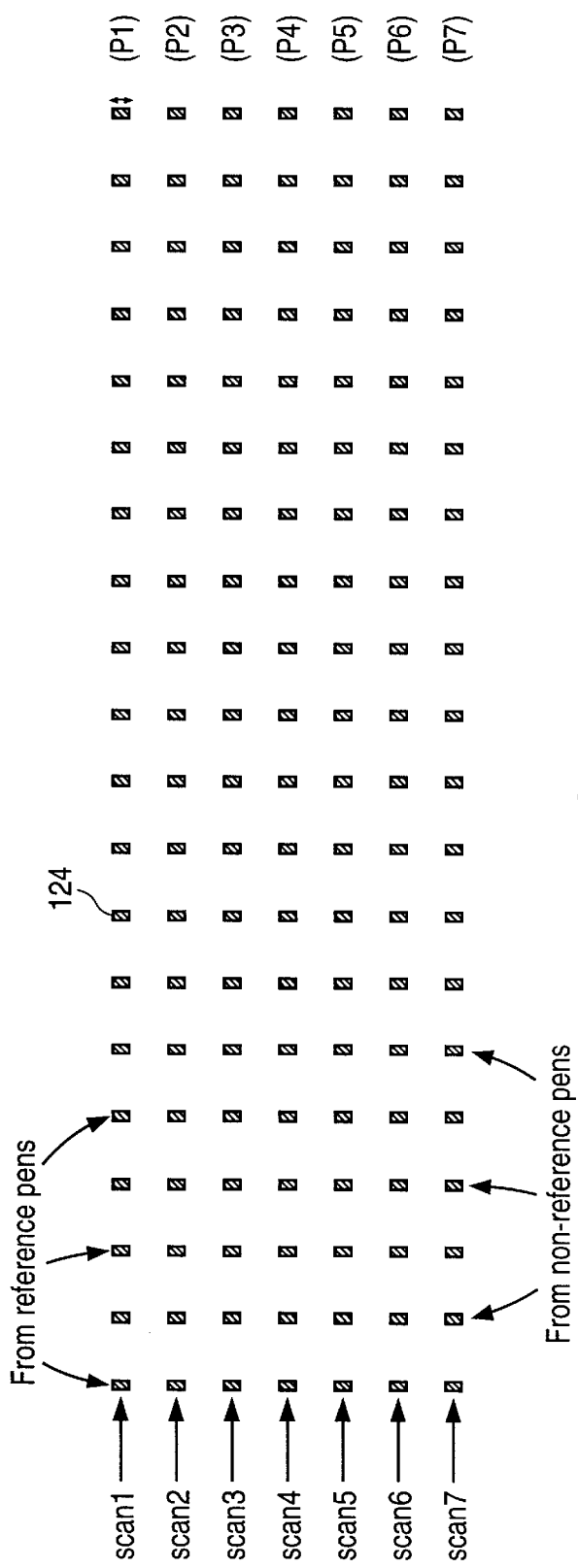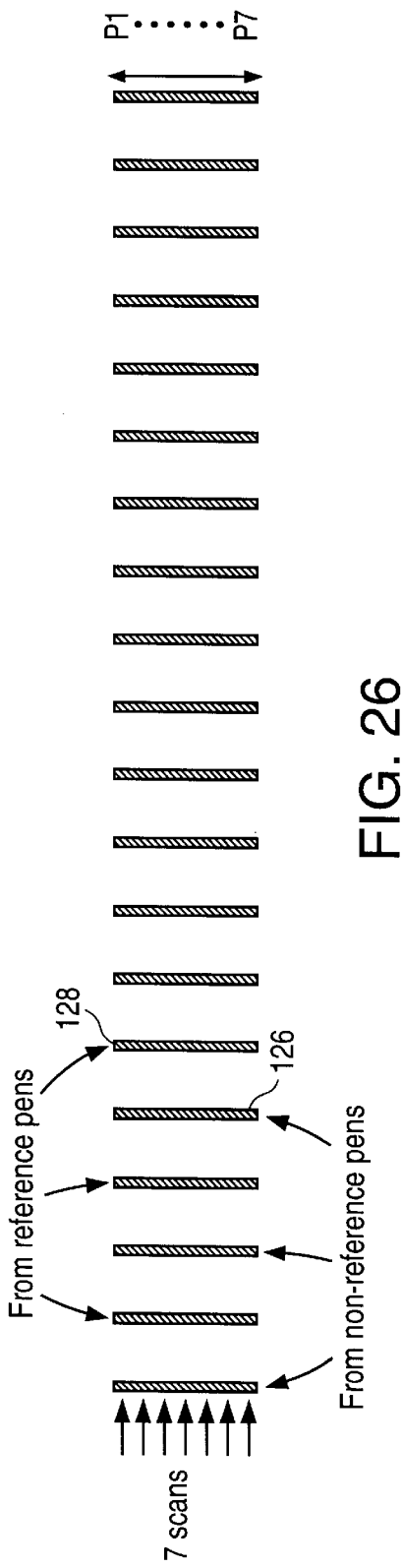
FIG. 25
FIG. 26

ALIGNMENT OF INK DOTS IN AN INKJET PRINTER

CROSS-REFERENCE TO RELATED APPLICATIONS

This is a continuation-in-part of U.S. application Ser. No. 08/796,835, filed Feb. 6, 1997, entitled "Fractional Dot Column Correction for Scan Axis Alignment During Printing," by Scott Norum et al., commonly assigned to the assignee of the present application and incorporated herein by reference.

FIELD OF THE INVENTION

This invention relates to inkjet printers and, in particular, to a technique for improving the alignment of dots printed by an inkjet printhead.

BACKGROUND OF THE INVENTION

U.S. Pat. No. 5,638,101, entitled High Density Nozzle Array for Inkjet Printhead, by Brian Keefe et al., and U.S. Pat. No. 5,648,806, entitled Stable Substrate Structure for a Wide Swath Nozzle Array in a High Resolution Printer, by Steven Steinfeld et al., are assigned to the present assignee and incorporated herein by reference. These two patents describe examples of an inkjet printer, incorporating an inkjet print cartridge, whose operation may be improved by the present invention. The below description of primitives used in printheads is taken from those two patents.

FIG. 1 is a simplified example of an inkjet printer 10. This will be used to illustrate the problem with prior art printers and, later, will also serve as a printer whose operation has been improved after being modified to incorporate the present invention. Inkjet printer 10 includes an input tray 12 containing sheets of paper 14 which pass through a print zone 15 for being printed upon. The paper 14 is then forwarded to an output tray 16. A moveable carriage 20 holds print cartridges 22, 24, 26, and 28, which respectively hold yellow, magenta, cyan, and black inks. The carriage 20 is moved along a scan axis by a conventional belt and pulley system and slides along a slide rod 30.

Printing signals from an external computer are processed by printer 10 to generate a bit map of the dots to be printed. The bit map is then converted into firing signals for the printhead. The position of the carriage 20 as it traverses back and forth along the scan axis is determined from an optical encoder strip 32, detected by a photoelectric element on carriage 20, to cause the various ink ejection elements on each print cartridge to be selectively fired at the appropriate time during a carriage scan.

FIG. 2 illustrates the printhead portion of a print cartridge, such as print cartridge 22 in FIG. 1, while FIG. 3 is a top-down detailed view of a nozzle plate 34 on the print cartridge. Three hundred nozzles 35 are shown. The primitives P1–P14 (to be described later) are labeled on the nozzle plate 34. The print cartridge 22 has contact pads 36 formed on a TAB circuit which electrically contact electrodes in cartridge 20 for receiving power and ground signals as well as the firing signals for the various ink ejection elements.

FIG. 4 illustrates a portion of the printhead substrate, underneath nozzle plate 34, associated with a single primitive. The printhead substrate is a rectangular piece of silicon having formed on it ink channels 40, ink ejection chambers 42, and heater resistors 44 using photolitographic techniques. The various ink channels 40 and chambers 42 are formed by a barrier layer 45 of photoresist. Ink flows into each chamber 42 via an associated ink channel 40. When current passes through a heater resistor 44, ink is vaporized to cause a droplet of ink to be ejected by an associated nozzle. Each ink channel 40 is designed to reduce cross-talk between the ink chambers 42 when fired.

To further reduce cross-talk, and to simplify the firing electronics and wiring, the heater resistors 44 are divided into primitives. FIG. 4 illustrates a single primitive having 22 heater resistors 44.

FIG. 5 illustrates firing circuitry on the substrate for a single heater resistor 44. To fire resistor 44, an address pulse is provided on address select line 46 to turn on drive transistor 47, and a primitive select pulse is provided on primitive select line 48 to cause a current to flow through resistor 44 sufficient to heat the resistor to a temperature needed to vaporize ink within the ink ejection chamber. Electrostatic discharge protection FETs 50 drain unwanted electrostatic charges, and a pull-down resistor 52 places all unaddressed select lines 46 in an off state.

All heater resistors 44 within a primitive receive the same primitive select signal, but only one of the resistors in a primitive at a time receives an address signal. This is illustrated in FIG. 6 where address signals A1 through A22 are generated in sequence for associated heater resistors 44 within each primitive during a single firing cycle while the printhead is scanning across the medium.

More particularly, the address select lines 46 (FIG. 5) are sequentially energized according to a firing order counter located in the printer from A1 to A22 when printing from left to right and from A22 to A1 when printing from right to left. The print data retrieved from the printer memory causes the print engine to energize any combination of the primitive select lines at the appropriate times during the firing cycle. The primitive select pulses rather than the address select pulses are preferably used to control the resistor current pulse width, as shown in FIG. 7. This is more desirable than using the address select pulses to control the pulse width since terminating an address pulse while the drive transistors 47 (FIG. 5) are conducting high current can cause avalanche breakdown and consequent physical damage to the MOS drive transistors. Accordingly, the address select lines are set before power is applied to the primitive select lines, and, conversely, power is turned off before the address pulse is removed. To provide uniform energy per heater resistor 44, only one resistor is energized at a time per primitive. However, any number of the primitives may be enabled concurrently. Each enabled primitive select pulse thus delivers both power and one of the enable signals to the drive transistor. Each address select line is tied to a corresponding address select line in all the other primitives.

Modern print cartridges may print on the order of 300 or 600 dots per inch (DPI), and the width of a printhead along the direction of the column of nozzles may be ½ inch or greater.

Due to various factors, it is extremely difficult to print precisely aligned dots on the medium as the printhead is scanning across the medium.

FIG. 8A illustrates an ideal vertical line 54 of connected dots printed during a single scan of the printhead across the medium. FIG. 8B is an exaggerated example of the actual line 56 printed during a single scan which was intended to convey a vertical line. The primitives from FIG. 3 used to print the line are identified in FIG. 8B. The skewing of the line at an angle with respect to the vertical axis 57 is due to the tilting of the print cartridge within the carriage in combination with the tilting of the printhead substrate with respect to the print cartridge. The wavering of the line 56 is due to a number of factors. One of the factors is the variation in the directionality of the ink droplets ejected from the nozzles. Another factor is that the paper may not be perfectly parallel to the plane of the nozzle plate. Another factor is that the nozzle plate may not be perfectly planar. Another factor is the different parasitic capacitances associated with the primitives.

Also, nozzles are formed in two offset columns, as shown in FIG. 3, to increase the density of dots in the direction perpendicular to the scan direction. To print a solid vertical line, the nozzles in the two columns must be fired so as to print dots which partially overlap on the medium. Thus, if the dots printed by the two columns of nozzles are not aligned precisely, distortion of the vertical line will result.

If the vertical line is made up of dots from different printheads, as would be for a composite color line, a blurring of the line would result by the nozzles in the printheads of the various print cartridges not being aligned with respect to each other.

The dot placement due to printhead misalignment gets worse when the printhead length is increased. Longer printheads enable higher throughputs but the manufacturing processes are not able to ensure the planarity of the nozzle plate necessary to guarantee the print quality requirements.

What is needed is a technique for improving the alignment of dots printed by an inkjet printer.

SUMMARY

In the inkjet printer discussed previously, to print a vertical line of dots, all primitives in a single column of nozzles (e.g., all even primitives in FIG. 3) were energized at the same time to fire the various heater resistors in the column.

In one embodiment of the inventive technique, printing instructions are provided to the printhead to print a predetermined pattern on a medium, and the printed pattern is detected by optical sensors in the printer. Based on the detection, a position offset error for each primitive is determined. These errors are used to generate a separate time correction for each of the primitives such that, when the printer is used normally, the firing pulses for nozzles in each primitive will be appropriately delayed or advanced so as to align the dots printed by the primitives. This will correct both the skew and line waver shown in FIG. 8B. This technique is referred to as fractional column correction.

In one embodiment, the pattern printed is a pattern of blocks of dots where each primitive prints a block of dots separated from other blocks. Thus, each block is associated with a known primitive. The distance from a centroid of each block printed by a primitive to a reference block printed by a reference primitive is then easily measured. In this manner, the timing corrections may be calculated for each primitive.

In another embodiment of the inventive technique, printing instructions are provided to the printhead while on the manufacturing line to print a predetermined pattern on a medium, and the printed pattern is detected by optical sensors in the manufacturing line. In one embodiment, based on the detection, the x,y position of the printed matter by each primitive relative to the printed matter by a reference primitive in the printhead is determined. These x,y positions are then stored in a non-volatile memory on the print cartridge itself. These x,y positions will be later used to identify dot misalignments associated with each primitive solely due to factors within the print cartridge itself.

The print cartridge is then installed in the carriage of a printer, likely incurring some undesirable rotation of the print cartridge which would normally skew printed lines. A stored program again causes the printhead to print a predetermined pattern on a medium. This pattern is detected by an optical sensor in the printer to measure the x, y position of printed matter printed by the primitive farthest from the reference primitive relative to printed matter printed by the reference primitive. In an alternative embodiment, any primitive position may be referenced to the reference primitive, and the most suitable primitive may be the one with the most stable position or the one easiest to measure.

Based on a comparison of the x,y position in the memory on the print cartridge and the newly detected x,y position, the rotation angle caused by the print cartridge being installed in the carriage is calculated. This rotation angle is then used to translate the original x,y positions in the print cartridge memory into the actual x,y positions, which take into account misalignments caused by the print cartridge as well as the carriage.

The resulting x,y positions are compared to ideal x,y positions, and a position error associated with each primitive is generated.

These errors are used to generate a separate time delay or advance for each of the primitives such that, when the printer is used normally, the firing pulses for nozzles in each primitive will be appropriately delayed or advanced so as to align the dots printed by the primitives. This will correct both the skew and line waver shown in FIG. 8B.

In another embodiment, some of the positional measurements are made by the manufacturing line sensor and the remainder of the measurements are made by the printer line sensor, with no rotational translation made.

By using test equipment in the manufacturing line, more precise measurements can be taken, as compared with measurements taken by the printer, and the printer can calculate the compensation faster.

BRIEF DESCRIPTION OF THE DRAWINGS

FIG. 14 illustrates the primitive select signal and address select signal of FIG. 7, after the primitive select signal is delayed in accordance with the invention.

FIG. 15A reproduces the uncorrected vertical line of FIG. 8B.

FIG. 15B shows the correction in the vertical line of FIG. 15A due to implementing the invention in the inkjet printer of FIG. 1.

FIG. 25 is a test pattern printed using seven scans, one scan per alignment primitive FIG. 26 is a test pattern printed during a single scan, where the optical sensor senses a portion of the pattern over multiple scans.

DETAIL DESCRIPTION OF THE EMBODIMENTS
ALIGNMENT USING PRINTER SENSOR ONLY

Figure 9:
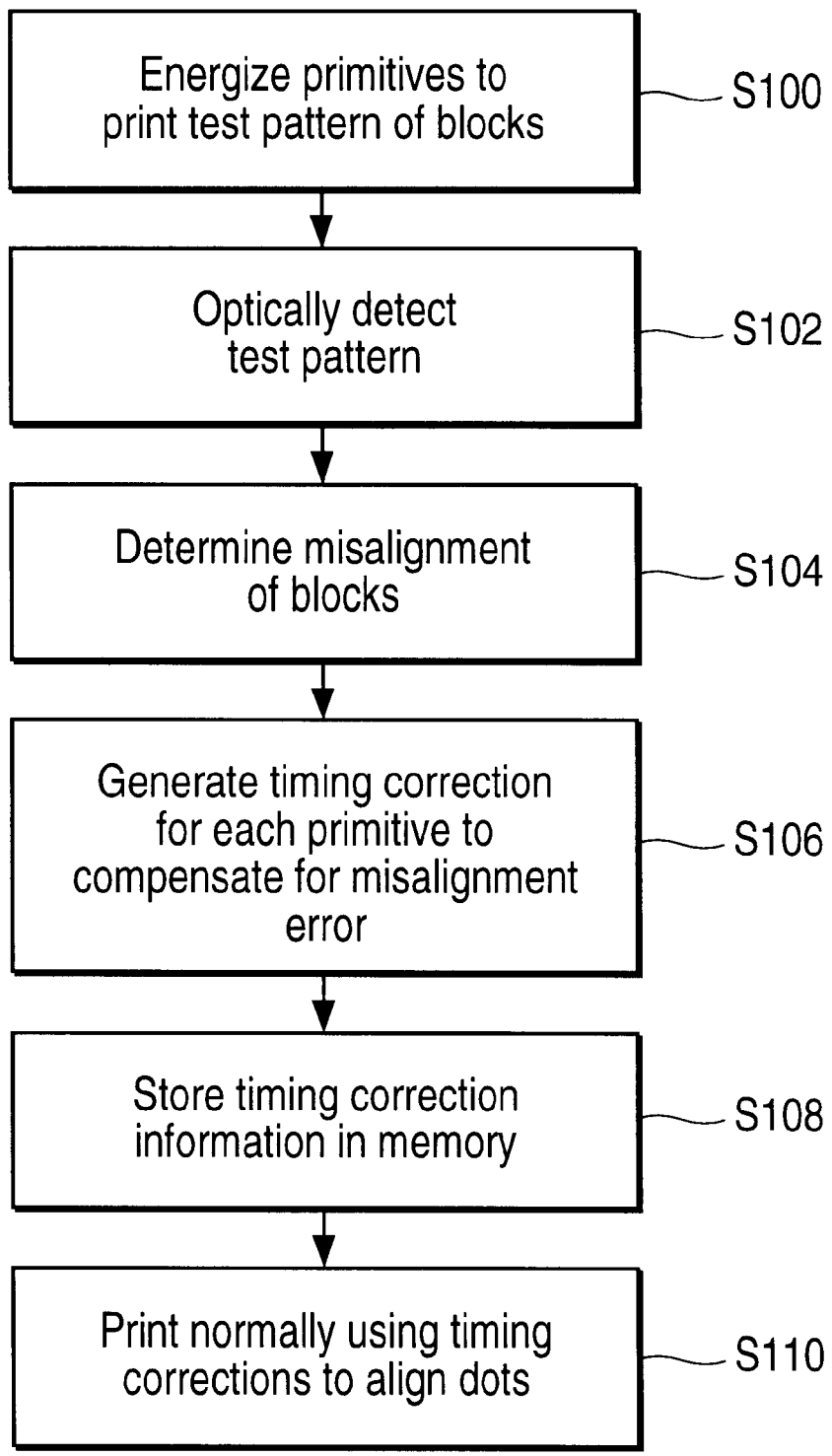
FIG. 9 is a flow chart illustrating the basic steps used in one embodiment of the inventive technique.

A basic flow chart of one embodiment of the inventive technique is shown in FIG. 9. It is assumed that the inventive technique is carried out by the inkjet printer of FIG. 1, where carriage 20 contains print cartridges similar to those described with respect to FIGS. 2–5 incorporating primitives.

The inventive technique tests the print cartridges while installed in the carriage 20 by determining the accuracy of a pattern printed by the print cartridges. The timing of the energization signals to the ink ejection elements, such as heater resistors, is then adjusted for each primitive to compensate for any printing misalignments. Details of this technique will now be described.

Figure 1:
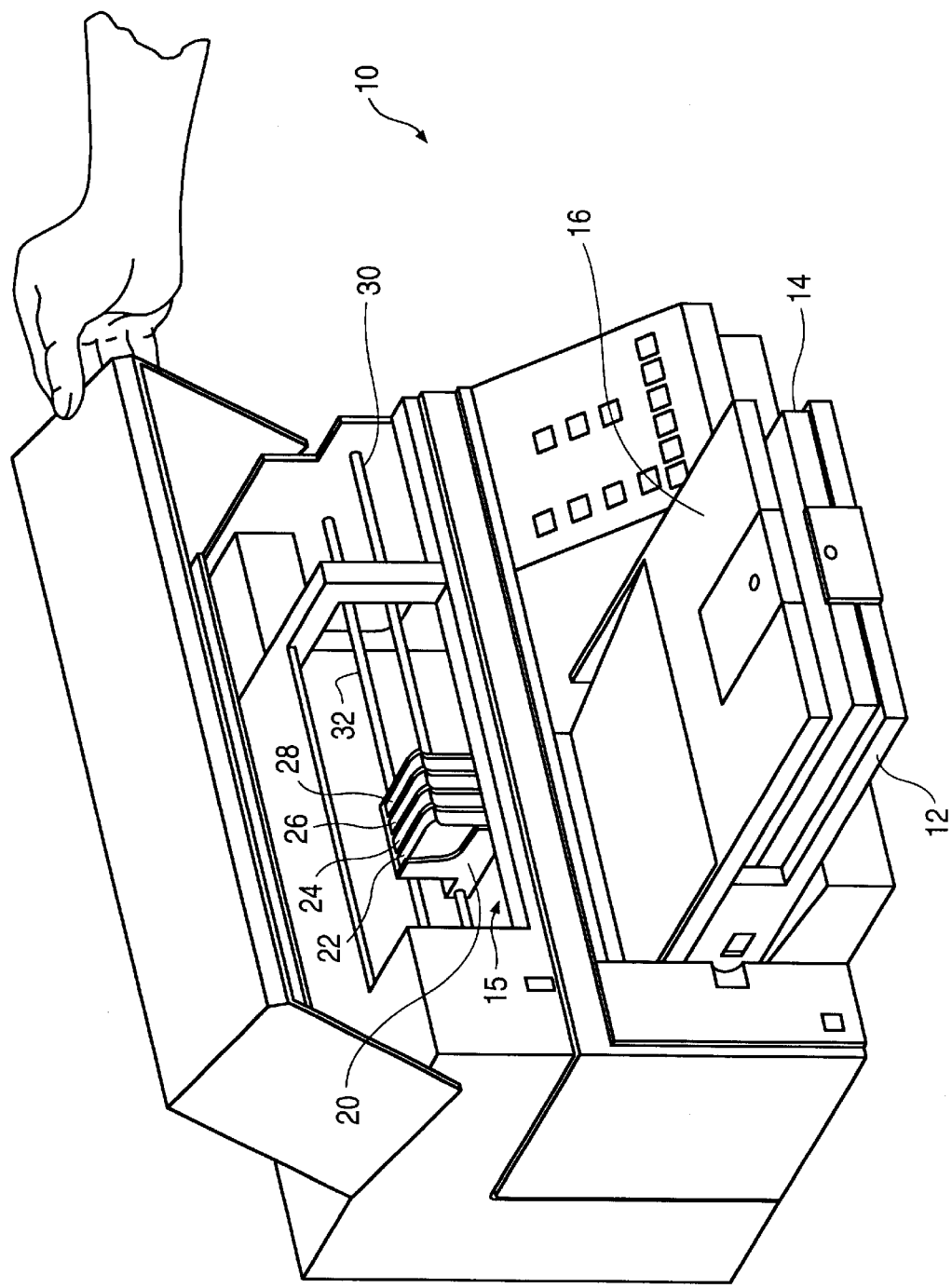
FIG. 1 illustrates one type of inkjet printer where print quality may be improved using the present invention.
Figure 2:
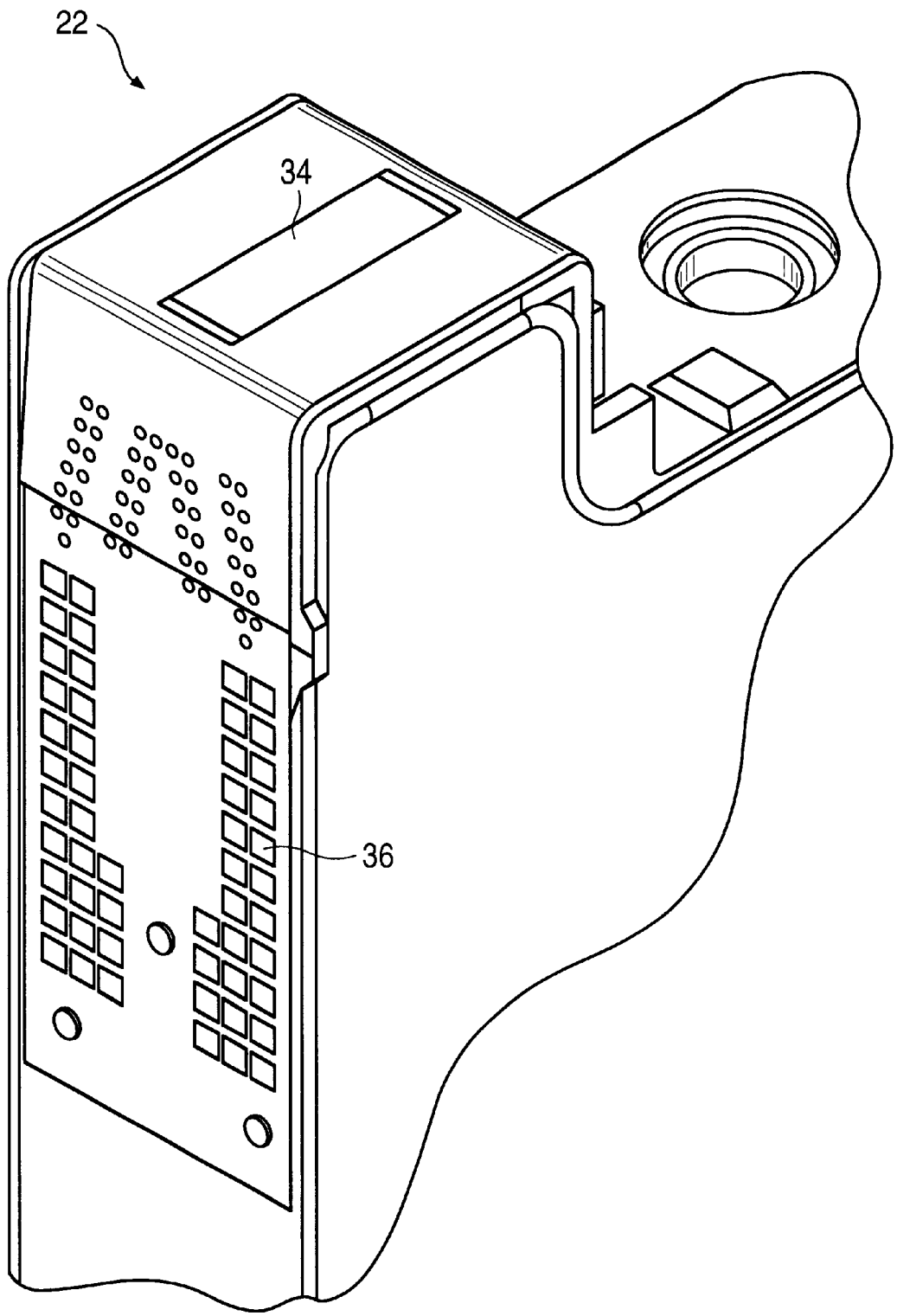
FIG. 2 is a perspective view of the printhead portion of a print cartridge.
Figure 3:
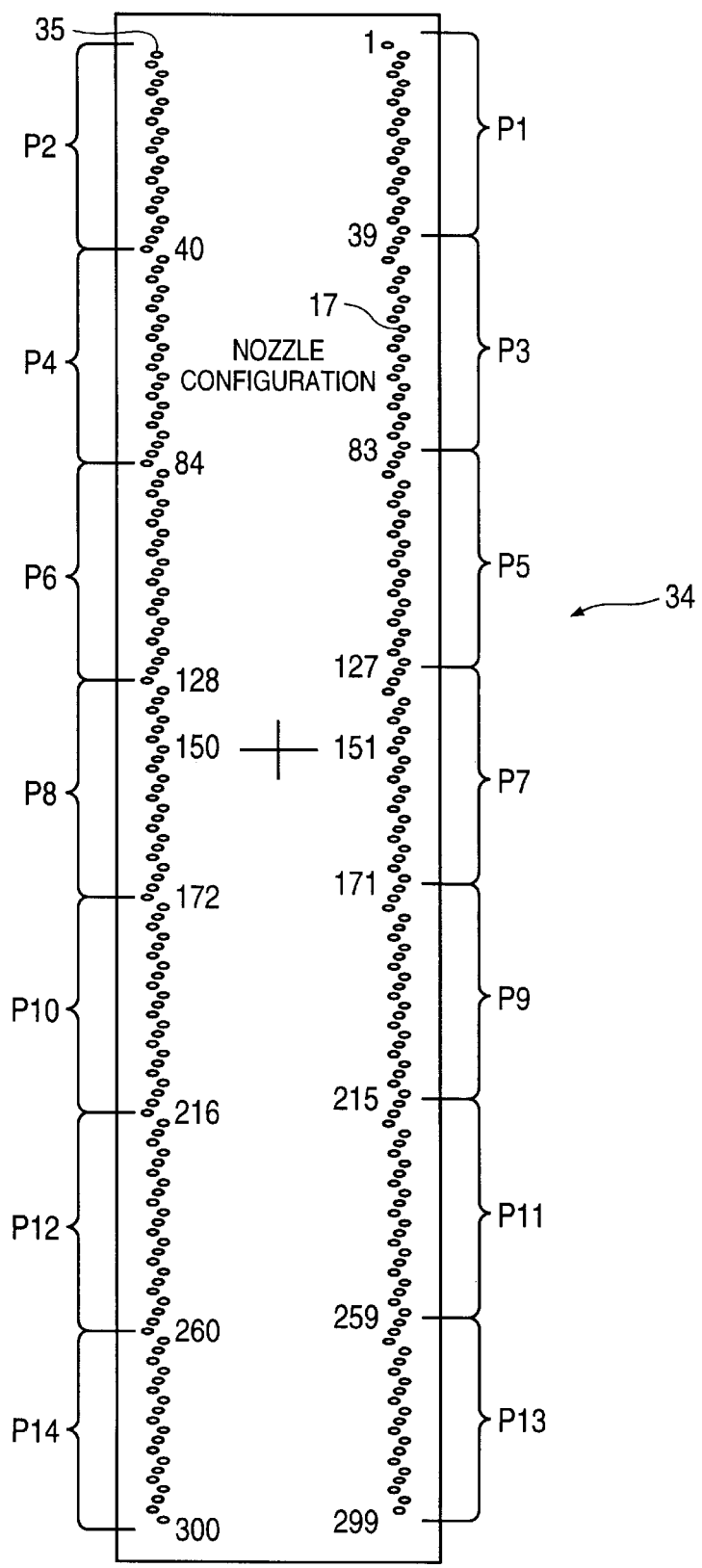
FIG. 3 is a top-down view of a nozzle plate in the print cartridge of FIG. 2.
Figure 4:
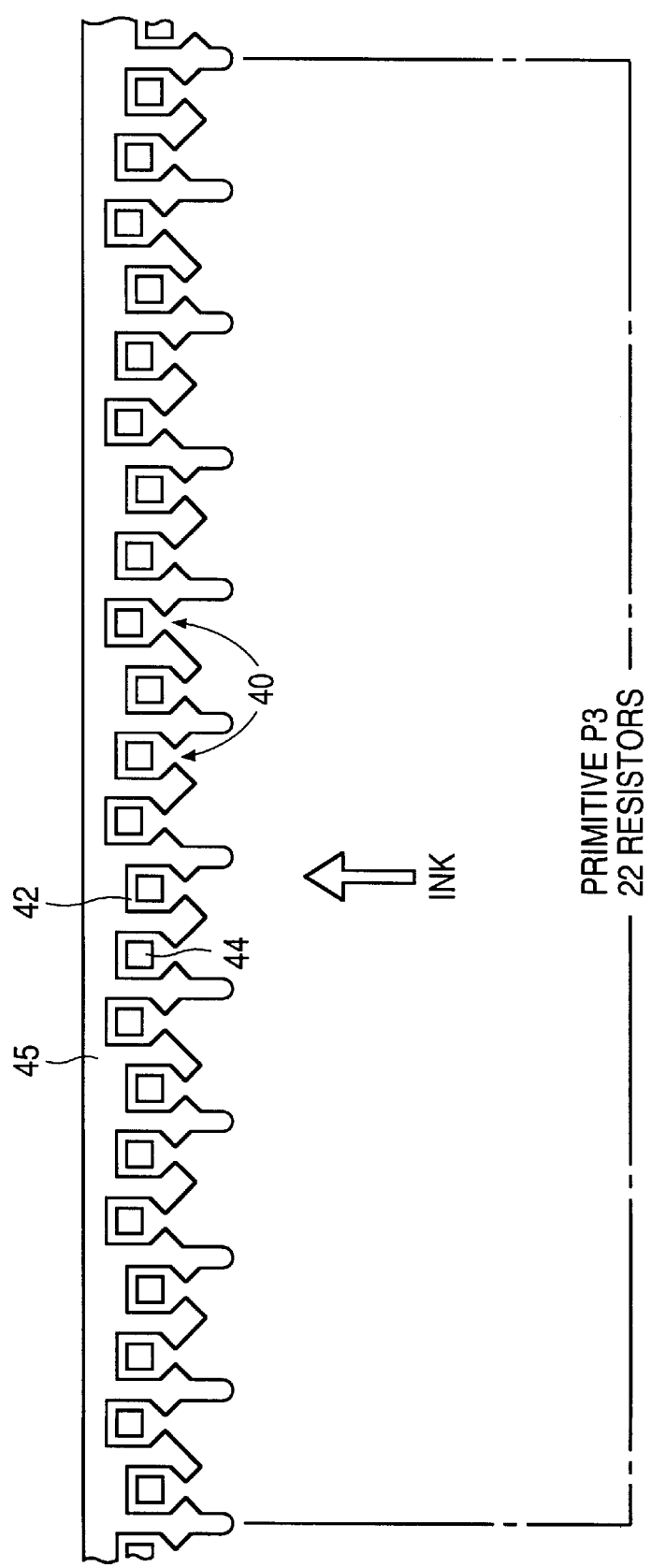
FIG. 4 is a top-down view of one primitive in a printhead substrate.
Figure 5:
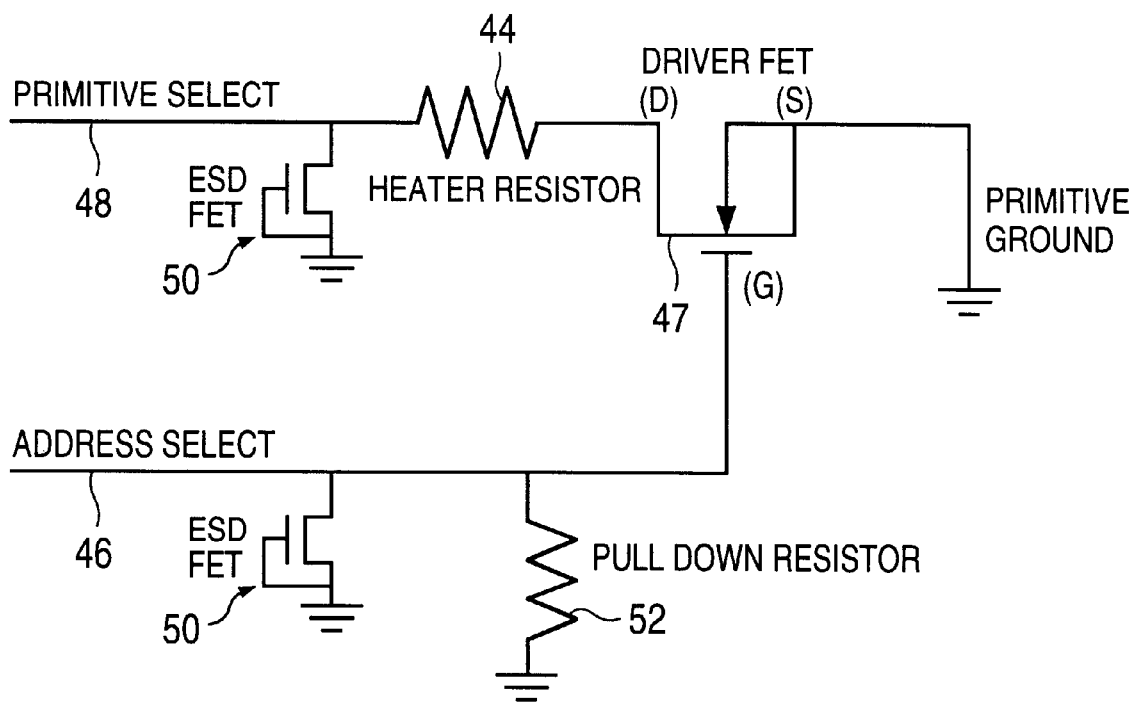
FIG. 5 is a schematic diagram of the drive transistor and corresponding circuitry for a single heater resistor.

In Step S100 of FIG. 9, a stored program in printer 10 of FIG. 1 causes energization signals to be applied to one of the print cartridges to print a test pattern of dots.

Figure 10:
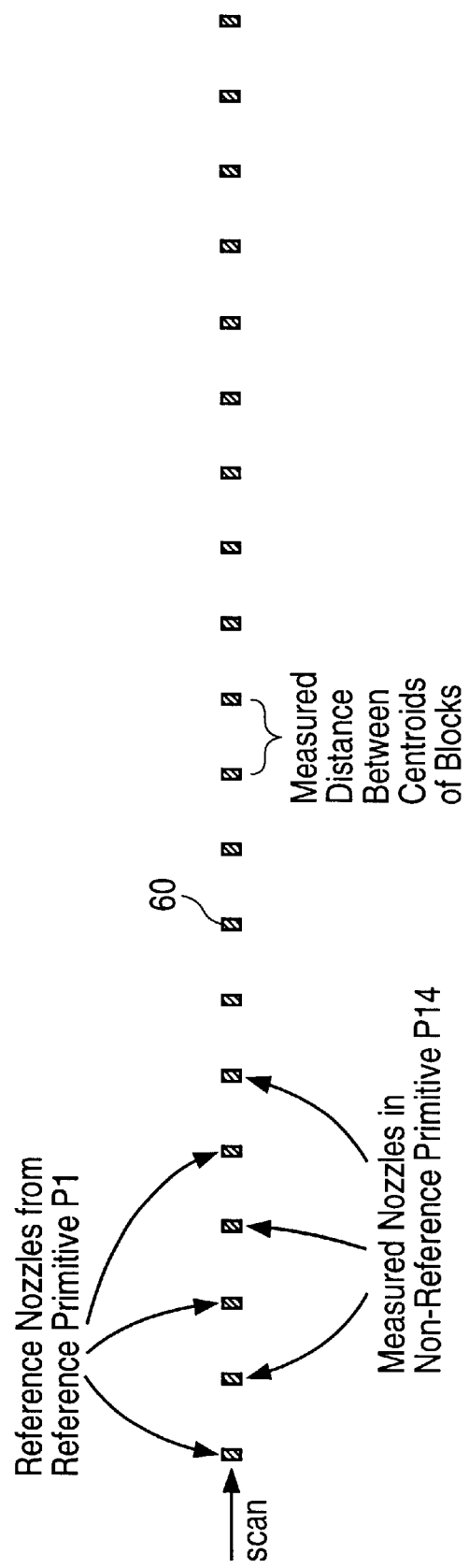
FIG. 10 illustrates the printing of a test pattern used for detecting alignment errors between a primitive (or primitive pair) and a reference primitive.

FIG. 10 shows a simple pattern printed by one or more printheads in the printer for detecting the alignment of the primitives. As an example, it will be assumed that the reference primitive referred to in FIG. 10 is P1 (see FIG. 3) in a cyan pen, and the position of primitive P14 in a black pen (in the same carriage as the cyan pen) is being measured to detect the skew of the printhead. Primitives P1 and P14 alternately print blocks 60. Since primitive Pi is vertically displaced from primitive P14 in the printhead, the paper must be shifted to print the blocks along a single line. It will be assumed that the reference primitive P1 prints the odd blocks and primitive P14 prints the even blocks along the scan axis.

The middle of each block along the scan axis is calculated based on the signal from the line sensor (to be described later). All primitives in all printheads in the scanning carriage are fired and measured relative to a reference primitive.

The calculations are made by a processor, on the main board of the printer, executing firmware code that controls all other printer operations, so no additional hardware is needed.

In one embodiment, the even and odd primitives for each printhead are printed separately and their positions relative to a reference primitive are measured.

The test pattern may be any other suitable pattern. Other suitable patterns are described later.

Figure 11:
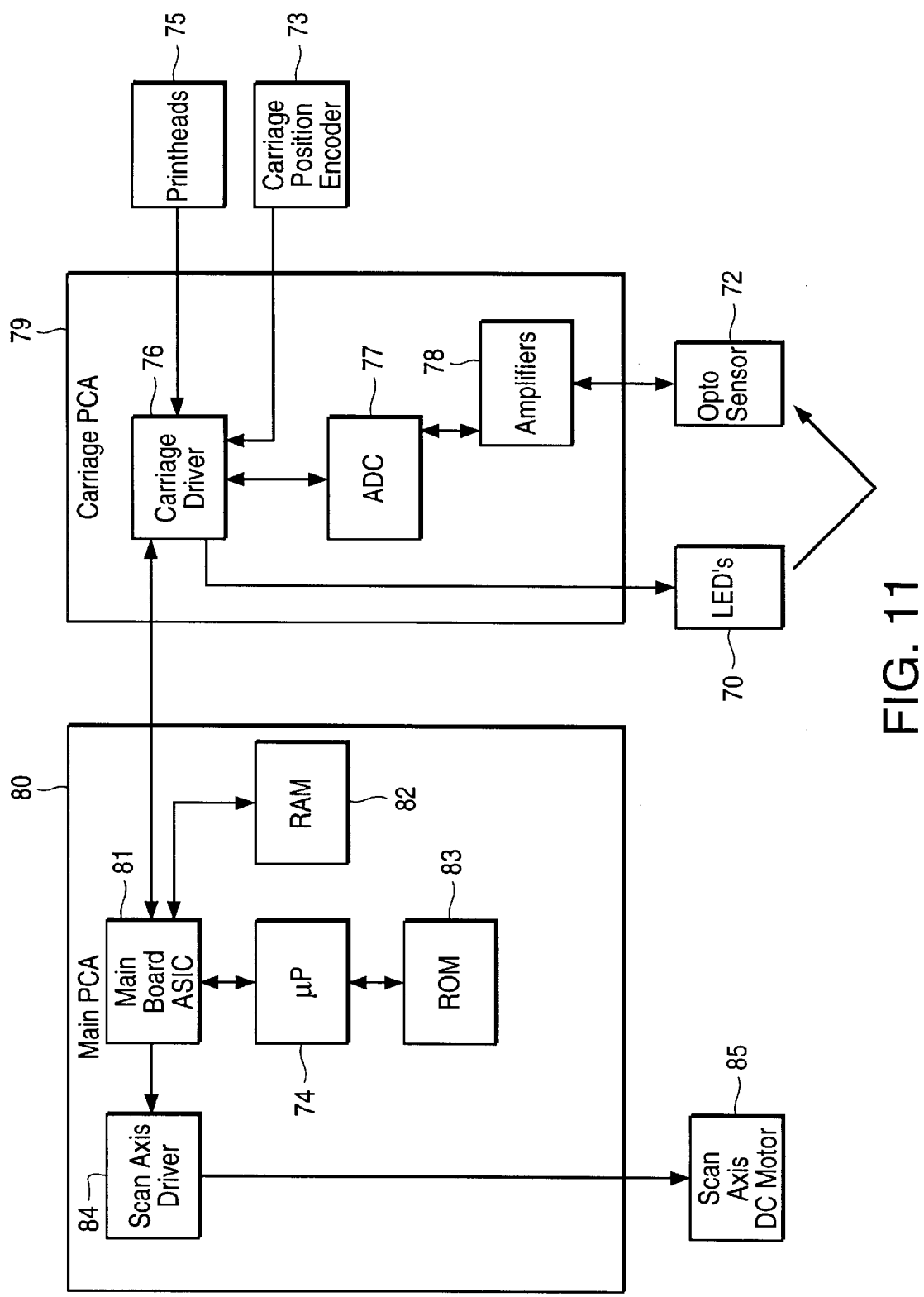
FIG. 11 is a simplified block diagram of the print engine circuitry and line sensor used to optically detect the pattern of FIG. 10.
Figure 12:
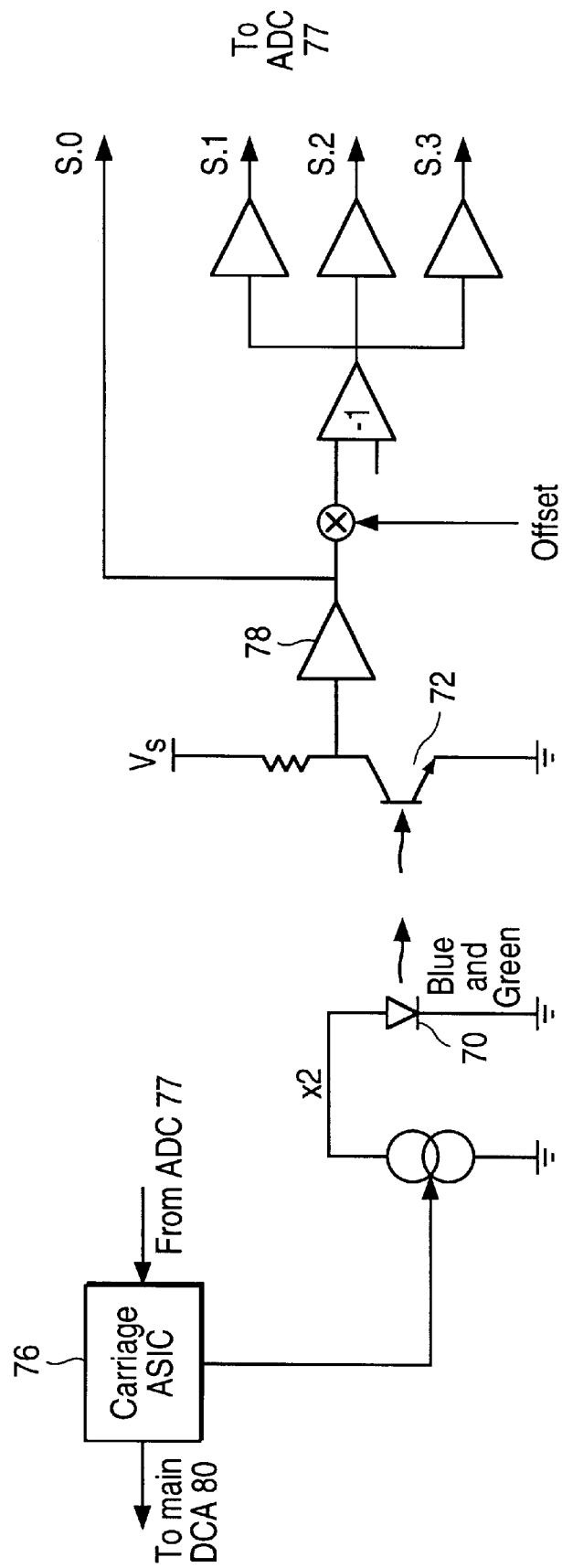
FIG. 12 illustrates the line sensor circuitry in greater detail.

In Step S102 of FIG. 9, the printed pattern of FIG. 10 is then optically detected by a line sensor within printer 10 of FIG. 1. FIGS. 11 and 12 show the pertinent portions of the printer line sensor.

The line sensor system shown in FIG. 11 uses two LED's 70 (one blue and one green) and an optical sensor 72. The blue LED is used for illuminating yellow ink, while the green LED is used for illuminating the remaining colors. Signals from sensor 72 are sampled at a certain rate, such as 600 samples per inch, as the sensor 72 scans across the medium. The samples are triggered by the carriage position encoder 73. Sampled data is analyzed by the main board processor 74 to determine the centroids of the primitives.

Also shown in FIG. 11 are the printheads 75, carriage ASIC 76, analog-to-digital converter (ADC) 77, amplifiers 78, carriage printed circuit board 79, main printed circuit board 80, main board ASIC 81, RAM 82, ROM 83, scan axis driver 84, and scan axis motor 85.

FIG. 12 shows the printer line sensor electronics, where the output of the optical sensor 72 is applied to amplifier 78 and suitably sampled for being converted into digital signals.

In Step S104, the distance from the centroids of all the primitives to a reference primitive is calculated from the data taken by the line sensor. The distances are compared to a predetermined ideal distance, and a position error (i.e., misalignment relative to the ideal primitive) associated with each primitive in the direction of scanning is identified. Applying the position error to each primitive enables the dots printed by each primitive to be aligned vertically. These errors typically range from a few microns to a few tens of microns.

In Step S106, each position error is associated with a time delay or time advance needed for each primitive select pulse to compensate for the position error as the printhead scans across the medium. The time delay for a primitive is calculated based upon the time it takes for the scanning printhead to scan through the position error. An increased time delay for a primitive select pulse will cause the line segment printed by that primitive to be printed farther to the right as the printhead scans to the right. In one embodiment, the timing delays are in increments of quarter dot shifts (0, ¼, 2/4, ¾). The resolution of the printhead may be 600 dpi.

Whole dot column shifts may be used to advance or delay a primitive select pulse in combination with a quarter dot delay shift. The printer generates firing pulses in a time period such that the spatial distance of the printed dots is the required one (e.g., 600 dpi). If certain dot data is fired in the previous firing period (i.e., timing is advanced), this produces the effect of moving that dot data one dot position in one direction. If dot data is fired in the next firing period, then the effect is the contrary. This technique allows the printer to correct any number of full dot positions in any one of the two printing directions.

For fractional dot corrections, in one embodiment, the pen can be programmed to introduce time delays from the moment it received the firing pulse to the moment the real dot is fired. These extra delays can be programmed to 0, ¼, 2/4, ¾ of dot. This allows for fractional corrections always in same direction of printing, but in combination with full dot corrections, we are able to apply corrections in any direction with a resolution of ¼ dot.

Figure 13:
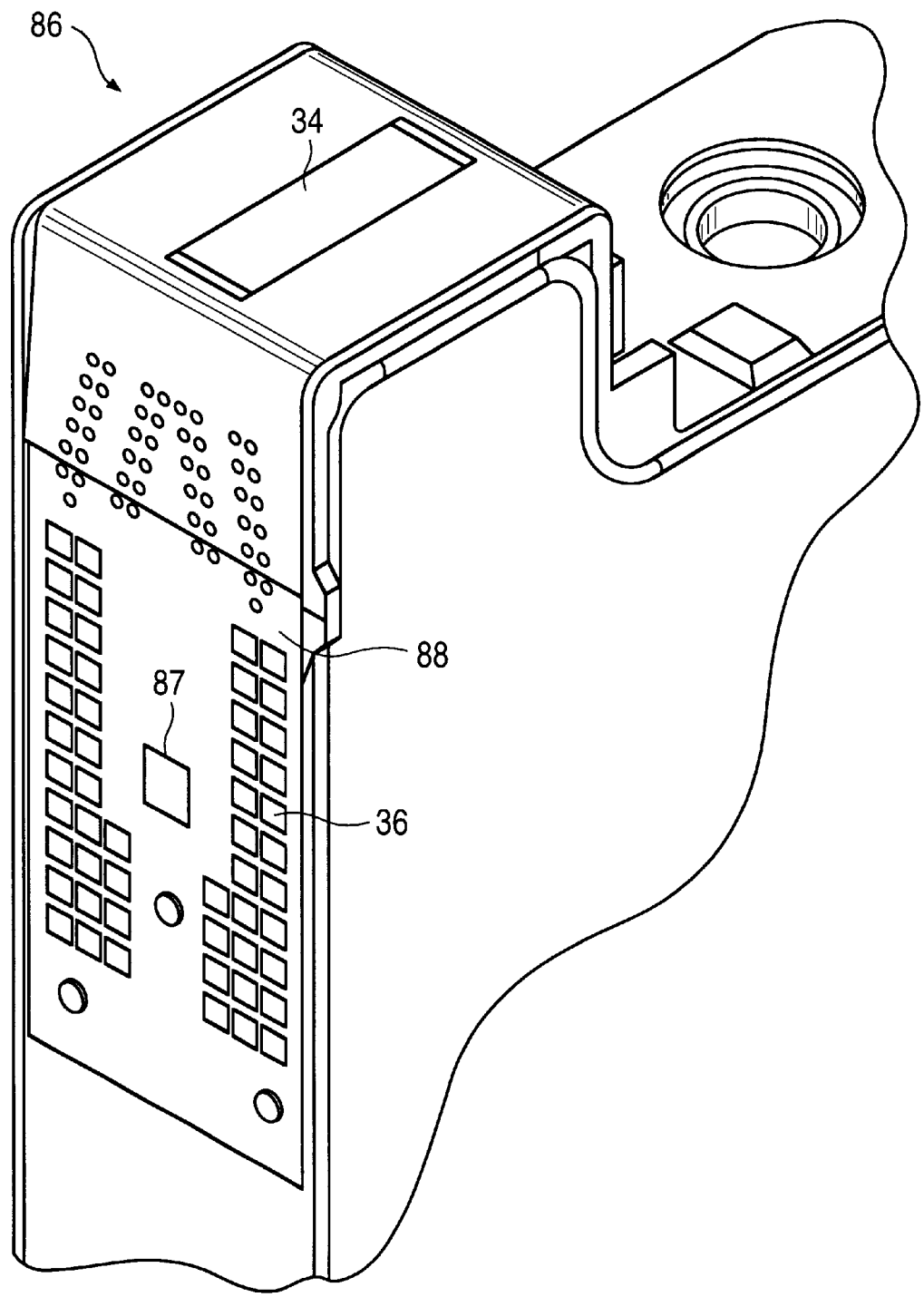
FIG. 13 illustrates a print cartridge having a memory chip or ASIC for storing alignment information.

In Step S108, the time correction for each primitive is stored in a non-volatile memory. Such a non-volatile memory may be in the printer 10 itself, in the print cartridge 86 (FIG. 13) memory chip 87, or in an ASIC on the print cartridge or carriage. FIG. 13 illustrates one convenient location for the memory chip 87 or ASIC under the TAB circuit 88 so that the memory may be programmed by applying signals to certain contact pads 36, connected to terminals on the memory chip by traces on the TAB circuit. Accordingly, data is now stored in the memory chip 87 or an ASIC which will be used to identify misalignments associated with each of the primitives relative to a reference primitive.

There are several ways to store the information used to cause the dot advance or delay. We can store the absolute distance from each measured primitive to the reference primitive, or we can store the distance from each measured primitive to the previous measured primitive. Other options are numerous. Any option would provide the same information but it is desirable to minimize memory usage. This information is used by the print engine to delay or advance the dot data.

In Step S110, the printer is used normally, and the timing corrections are used to align the printed dots.

FIG. 14 illustrates an example of the delay in the primitive select pulse for primitive P10 relative to the primitive select pulse for primitive P4 in order to align the dots printed by any of the nozzles in primitive P10 with those dots printed by any of the nozzles in primitive P4. Similar timing delays would be associated with other primitives relative to primitive P4. Full dot corrections (delay or advance) can also be introduced, as previously mentioned.

The embodiments described above align the centroids of the primitives; however, the addressing signals for each nozzle may also be compensated to align the individual nozzles.

Figure 6:
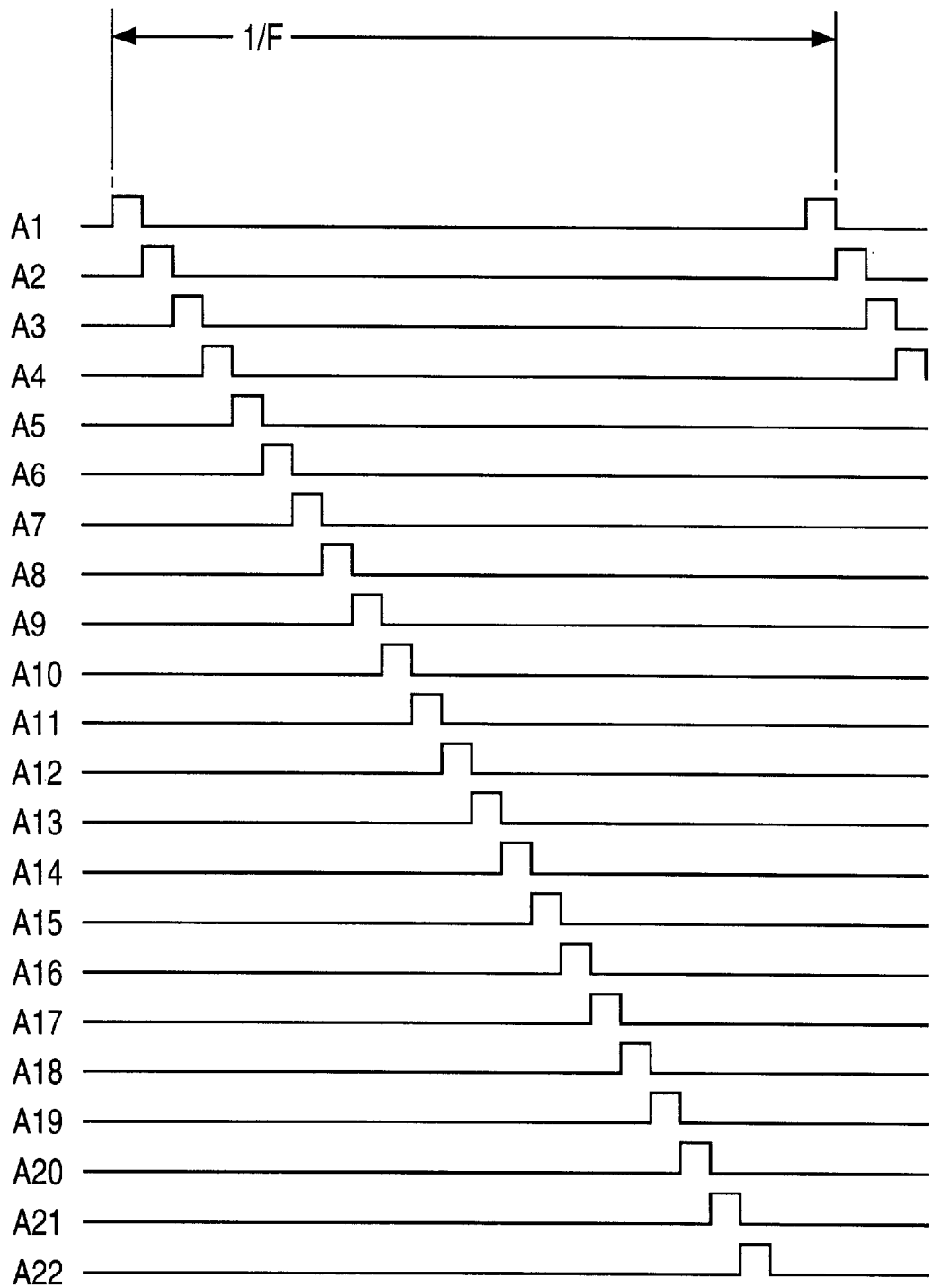
FIG. 6 illustrates the sequential firing of heater resistors in a single primitive for a firing cycle.
Figure 7:
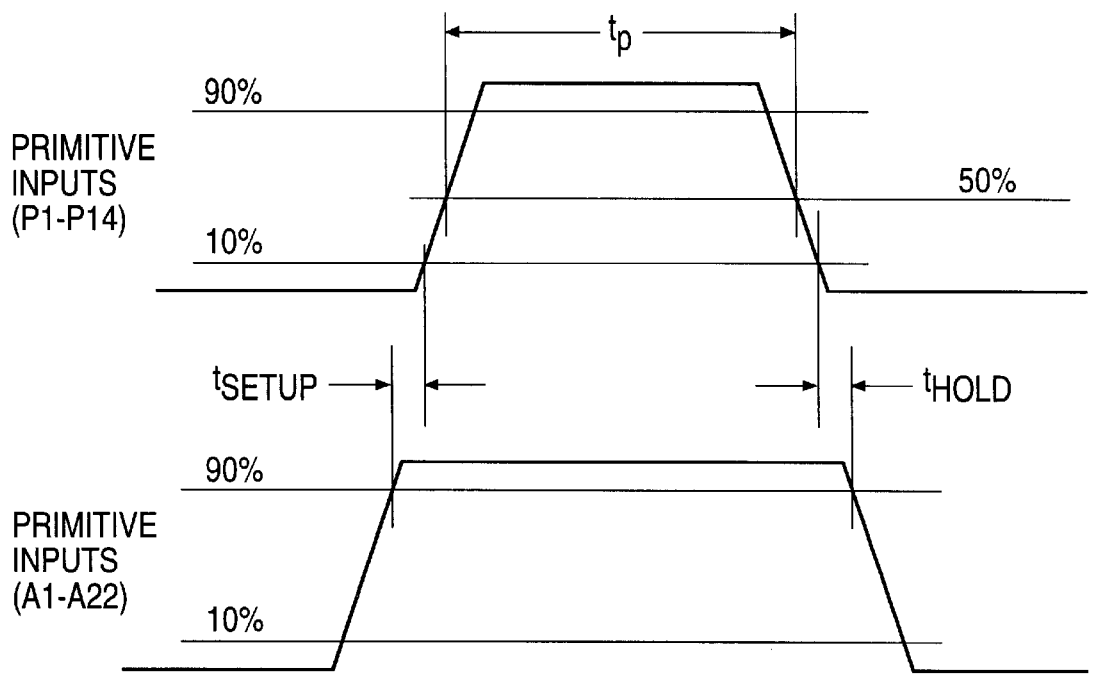
FIG. 7 illustrates the synchronization of the primitive enable signal and the address signal for each of the heater resistors.
Figures 8A, 8B:
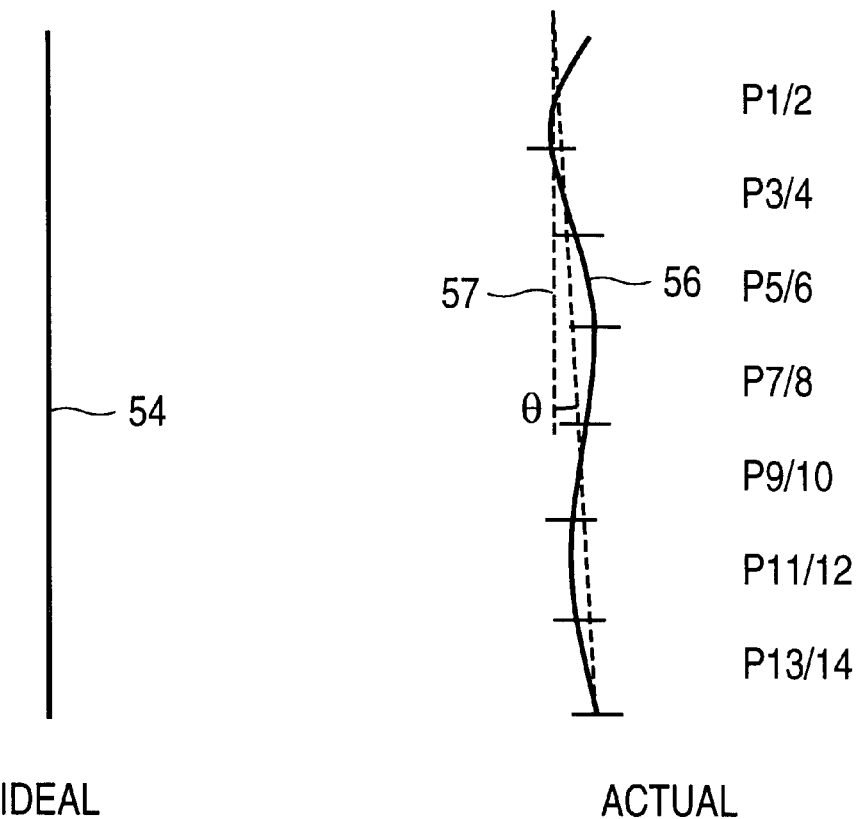
FIG. 8A illustrates an ideal printed vertical line of dots, perpendicular to an scanning direction.
FIG. 8B illustrates the actual printed vertical line of dots without using the invention.

If the printer to be used is similar to that described in U.S. Pat. No. 5,638,101, assigned to the present assignee, then the order of firing of the nozzles in each primitive will be that described in the '101 patent to minimize cross-talk and to allow the sequential application of the address signals shown in FIG. 6 to be at least partially offset by the physical offsetting of the nozzles (FIG. 3) in each column of nozzles.

FIG. 15A illustrates the printing of a vertical line prior to the correction, and FIG. 15B illustrates the printed line after correction. Notice that the corrected line in FIG. 15B is discontinuous since the printing of dots by a primitive is now essentially independent of the printing of dots by any adjacent primitive. Discontinuities smaller than 32 microns will not be perceived by the naked eye. In FIG. 15B, there is a negligible difference between the rightmost dot printed by the column and the leftmost dot printed by the column. Both the tilt angle and the wavering of the line have been essentially eliminated.

Figure 16A:
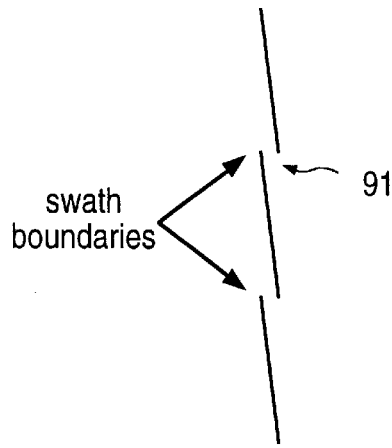
FIG. 16A illustrates an uncorrected vertical line printed by three swaths.
Figure 16B:
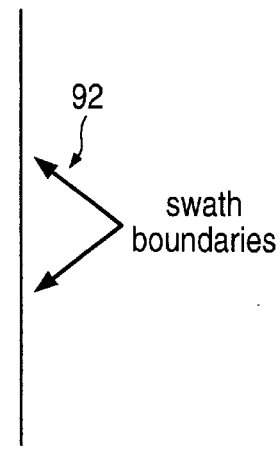
FIG. 16B illustrates the resulting corrected vertical line printed by three swaths.

FIG. 16A illustrates a vertical line 91, prior to correction, printed after three scans, or by three swaths, and FIG. 16B illustrates the resulting line 92 after correction. The discontinuities in FIG. 16A are at the swath boundaries. Each segment of the vertical line printed in a single swath is that shown in FIG. 15A or 15B.

If a print cartridge in the carriage is replaced, new time corrections must be generated for the print cartridge.

Figure 17A:
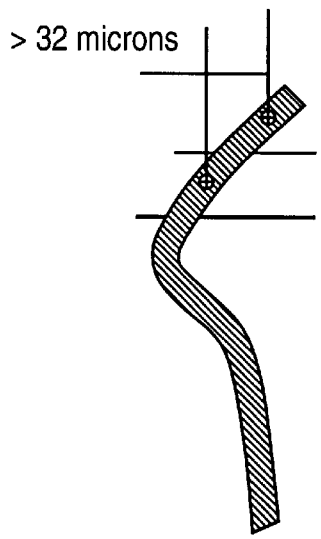
FIGS. 17A, 17B, and 17C illustrate the use of limited compensation, rather than full compensation, to correct for misalignment errors.
Figure 17B:
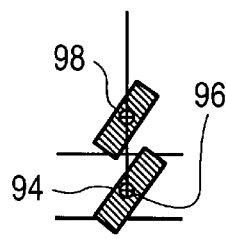
Figure 17C:
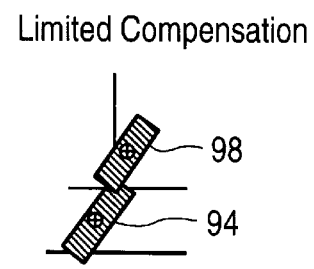

Referring back to the corrected vertical line in FIG. 15B, any discontinuity in the vertical line between adjacent primitive segments greater than 32 microns may be perceived by the naked eye. Accordingly, if the wavering of the line, such as shown in FIG. 17A, is severe enough, a full correction of a primitive segment 94 by aligning the centroid 96 of the segment 94 with the remainder of the segments 98, as shown in FIG. 17B, may cause a discontinuity in the corrected line greater than 32 microns. Therefore, in such instances, it is not desirable to fully compensate the primitive segment 94 to align its centroid with centroids of other primitive segments 98. Accordingly, if it is determined that adjacent primitives have an error difference greater than 32 microns, a limited compensation will then be applied. This is illustrated in FIG. 17C where the limited compensation segment 94 is shown being only partially corrected. In one embodiment, if it is determined that the error difference between the centroids of segments printed by adjacent primitives is greater than 32 microns, then only a fixed percentage (e.g., 50%) of the final compensation is implemented for the appropriate primitive to cause any resulting discontinuity to be less than 32 microns. In another embodiment, the required correction is truncated to 32 microns. In another embodiment, an optimum compensation is calculated in order to minimize any discontinuity.

Figure 18:
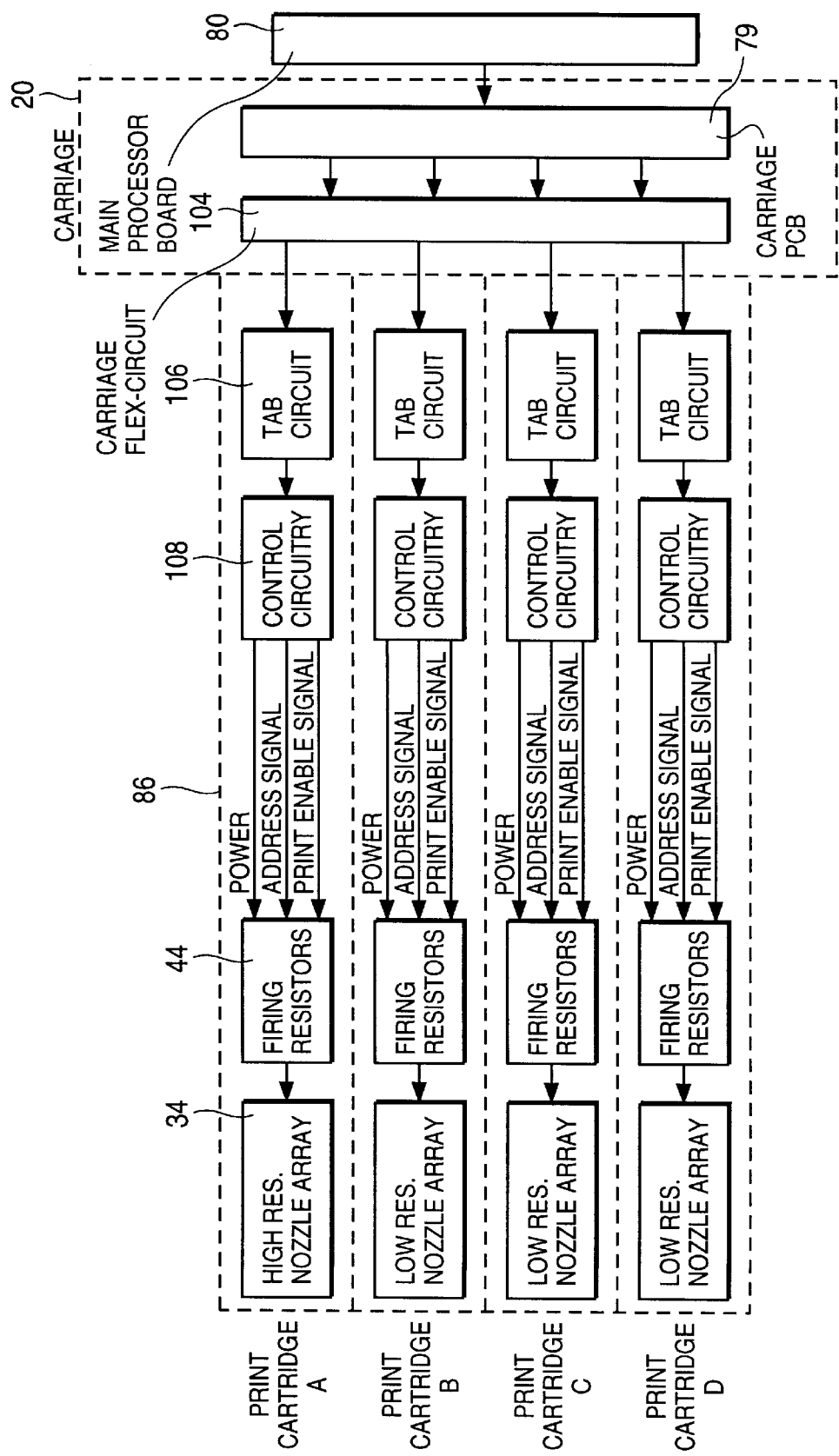
FIG. 18 illustrates the hardware used to implement one embodiment of the invention.

FIG. 18 illustrates the basic circuitry in print cartridge 86, carriage 20, and printer 10 for generating the firing signals for the ink ejection elements in the printhead. The main processor board 80 in the printer performs the well known steps of decoding the print signals from the personal computer connected to an input of the printer and creating a bitmap of the dots to be printed in a swath buffer forming part of the main processor board 80. The data is transferred to the carriage printed circuit board 79, which uses timing signals from the optical encoder strip 32 (FIG. 1) to generate the primitive and address select signals for the printhead. A carriage flex circuit 104 contains electrodes for being contacted by the contact pads on the print cartridge TAB circuit 106. A control circuit 108 on the printhead distributes the signals to the various heater resistor circuits shown in FIG. 5 and contains the memory for the x,y primitive positions. The firing resistors 44 vaporize a portion of the ink in an ink ejection chamber to expel a droplet of ink through an associated nozzle in a nozzle array 34.

The timing correction coefficients may be stored in any of the stages in FIG. 18, such as in the carriage printed circuit board 79, in the main processor board 80, or in the print cartridges themselves. Since some of the printer operations are typically controlled by an ASIC, the timing corrections may be conveniently stored on the ASIC. The full dot corrections are achieved by programming some registers in the ASIC that sends the data from the main board to the carriage board. Those registers control the number of zero data at the beginning of the swath sent to the printhead before the actual data. By changing the number of zero-data sent, we can advance or delay the firing of actual data for an alignment group in relation with other alignment groups. For the ¼ dot delay increments, digital circuitry (e.g., an ASIC) on the print cartridge or carriage is programmed to determine when the real firing will take place. In one embodiment, with each firing pulse, we are generating 16 pulses. The printhead will start firing the nozzles in the 1, 4, 8 or 12 pulse depending on the programmed ¼ dot delay.

The invention may be used for any type of printhead. The printhead may be a thermal type or other type, such as those using piezoelectric elements. Inkjet and non-inkjet printers may benefit from this technique.

ALIGNMENT USING A MANUFACTURING LINE SENSOR ALONG WITH THE PRINTER SENSOR

In another embodiment of the invention for achieving fractional column correction, the misalignment of dots caused by the directionality of the nozzles and misalignment of the printhead substrate with respect to the print cartridge is measured on the manufacturing line with more sophisticated equipment than can be provided on a printer. The results of the measurement are then stored in a memory chip on the print cartridge for later use by the printer when generating the timing delay signals. This saves some time and reduces the required test pattern size when the printer is calculating the time delays. This embodiment is described below.

Figure 19:
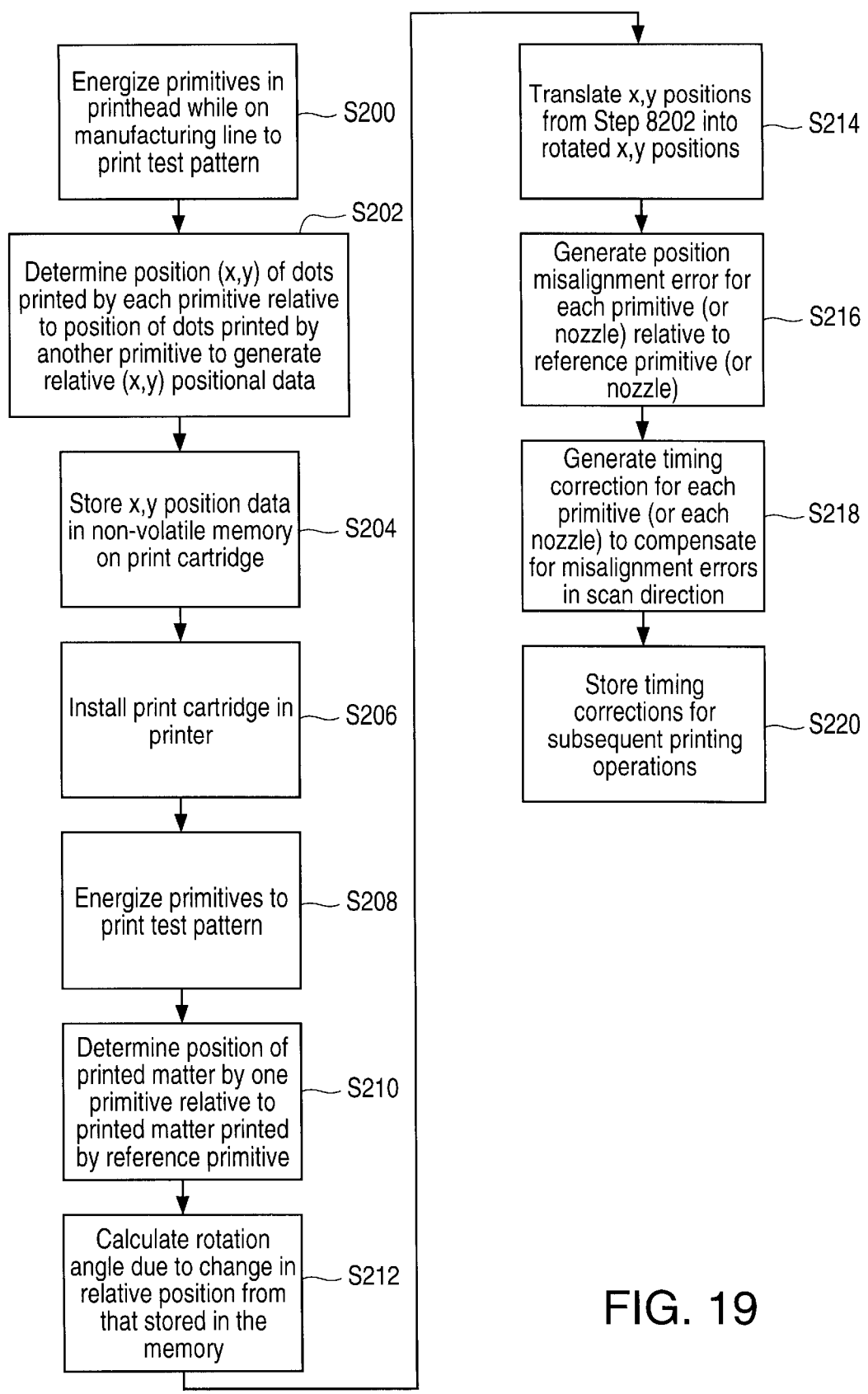
FIG. 19 is a flowchart illustrating the basic steps used in another embodiment of the inventive technique utilizing a manufacturing line sensor.

A basic flowchart of this alternative embodiment technique is shown in FIG. 19.

Figure 20:
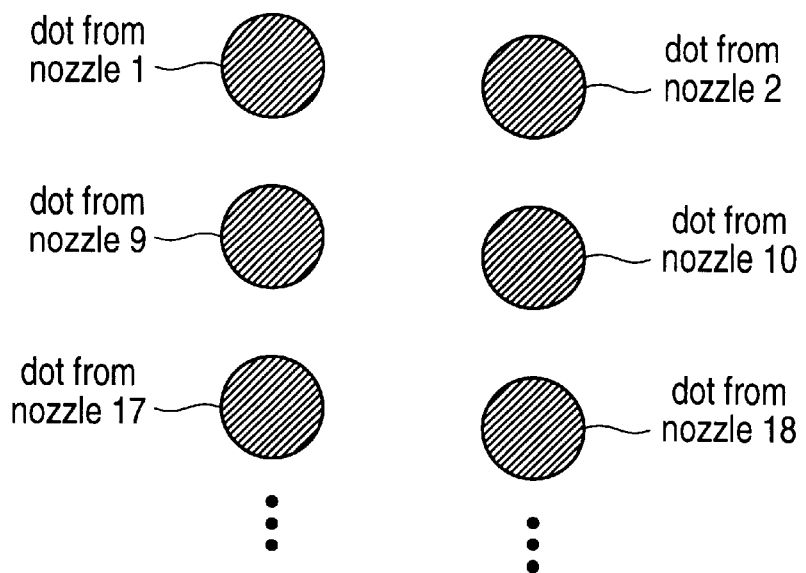
FIG. 20 illustrates a test pattern that may be printed on the manufacturing line for detecting alignment of the primitives.

In Step S200 of FIG. 19, after a print cartridge is manufactured at the factory, the print cartridge is installed in a reference carriage stall, which emulates the actual carriage 20 (FIG. 1) in a printer. Energization signals are then applied to the contact pads of the print cartridge to print a predetermined test pattern of dots, such as shown in FIG. 20. For print cartridges with nozzle plates similar to that shown in FIG. 3, ink droplets will be ejected out of both columns of nozzles. The left printed column is printed by odd-numbered nozzles, and the right printed column is printed by even-numbered nozzles. To isolate each dot from other dots, only every fifth nozzle is fired.

Figure 21:
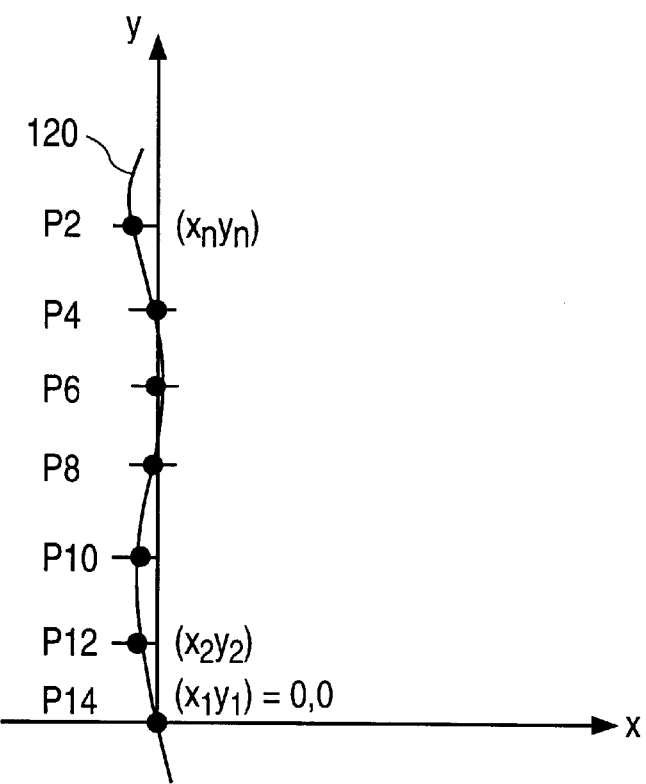
FIG. 21 illustrates a vertical line printed by a print cartridge in a manufacturing line showing the waver of the vertical line due to non-uniform directionality of the nozzles and misalignments in the printhead.

If the printhead on the manufacturing line were to print a solid vertical line, using a single column of nozzles in the printhead, the result may be that shown in FIG. 21. Any skewing of the line 120, as opposed to wavering of the line, is not particularly relevant at this stage, so the line 120 of FIG. 21 is drawn with no skew. The primitives used to print each segment of the vertical line in FIG. 21 are identified in FIG. 21, and the center points of these segments are identified with a dot. These primitives are those found on the left side of the nozzle plate in FIG. 3. The wavering of the line, as previously discussed, may be caused by variations in ink drop trajectories. The wavering of the line may also be due in part to each primitive not being identical physically or electrically. For example, the MOS drive transistors may have slightly different turn-on delays, and varying parasitic capacitances may result in slight timing skews when energizing the primitives.

Referring back to FIG. 20, the dot pattern printed may then be detected as follows.

In Step S202 of FIG. 19, using an optical sensor in the manufacturing line, the x,y position of each dot's center is detected to generate mean distances between primitives.

Figure 22:
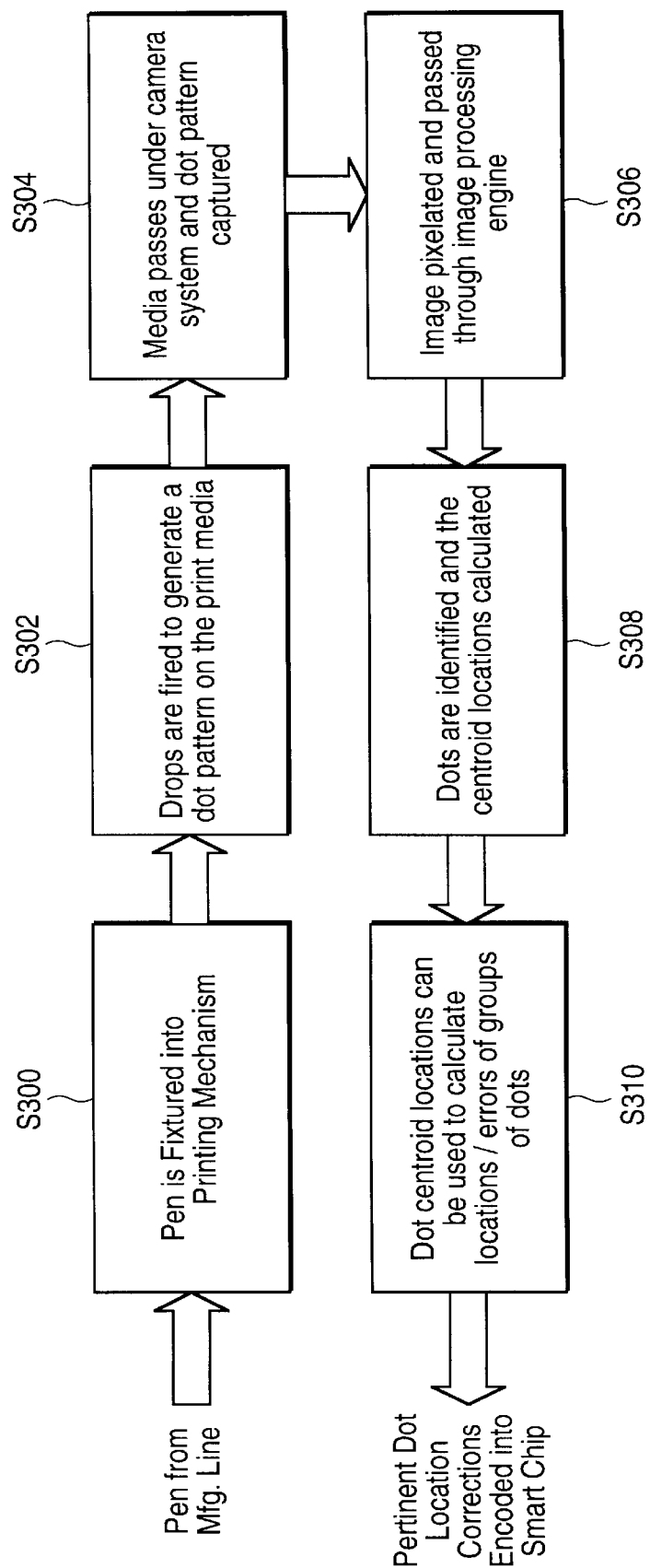
FIG. 22 is a flow chart describing the basic steps used on the manufacturing line for sensing characteristics of the test pattern in FIG. 20.

The manufacturing line sensor is a high resolution/high magnification camera-based measurement tool which can measure the relative position of dots and other printed objects on paper relative to fixed fiducials or other alignment marks printed on the paper. FIG. 22 illustrates the basic steps performed by the manufacturing line sensor and the subsequent processing of the positional data. At step S300 a pen on the manufacturing line is fixtured onto the printing mechanism. At step S302 the printing mechanism ejects drops of ink to generate a dot pattern on the print media. At step S304 the system passes the media under a camera system to capture the dot pattern. The system samples a printed image then pixelates the data on a higher resolution grid at Step S306. At Step S308, using image processing techniques dots and other printed artifacts can be identified, and the positions of their centroids can be calculated. At Step S310 relative distances can then be calculated using the calibration constants of the camera to translate from pixels to microns. If one camera cannot accurately capture the entire test pattern printed by the printhead, all dot locations can be measured by capturing successive images from other cameras staggered spatially.

Assuming a pattern similar to FIG. 20 is printed with a pen on the manufacturing line, and assuming a fixed distance from the pen to the print media, relative trajectory errors of the nozzles on the pen can be calculated using the measured displacements on the paper.

Because of the nature and design of the measurement system, the most accurate measurements can be made between odd and even nozzles in the same region of the pens. For example, the measurement capability is much higher measuring the distance between nozzle 1 and nozzle 2 (or primitive 1 and primitive 2) than between nozzle 1 and nozzle 511 (or primitive 1 and primitive 31) in a 600-nozzle pen, because different images from the camera(s) need to be consolidated together in the latter case, whereas the dots in the former case are from the same image.

Thus, the mean distances between opposite primitives (i.e., 1 and 2) would be calculated from dot positions of the associated nozzles which make up those primitives. This "pair-wise" mean separation is what is encoded in a memory chip on the print cartridge for each opposite pair of primitives. These mean offsets are then later used in the printing system to apply a preliminary scan axis direction compensation. This allows the printer to print odd and even primitive pairs overlapping each other during the system calibration, allowing a more robust measurement and a faster calibration time by virtue of eliminating extra alignment blocks.

Any other measurement may be made by the manufacturing line sensor to identify the initial relative positions of the dots or primitive centroids. Such other measurement may be the distances of the primitive centroids to a single reference primitive. No measurements of the skewing of the printhead need to be made at this point.

In the embodiments described herein, timing corrections are ultimately made for misalignments in the scan axis direction only. Hence, vertical misalignments between the primitives do not need to be detected, since they are not corrected. Additional methods may be used to correct for alignments in the paper shift direction.

Thus, at this stage, each of the primitives has associated with it an x,y position relative to another primitive.

In Step S204 of FIG. 19 the x,y position data for each of the primitives is stored in a non-volatile memory chip secured to the print cartridge (e.g., print cartridge 86 in FIG. 13). Accordingly, data is now stored in the memory chip 87 which will be used to identify misalignments associated with each of the primitives relative to a reference primitive.

Figure 23:
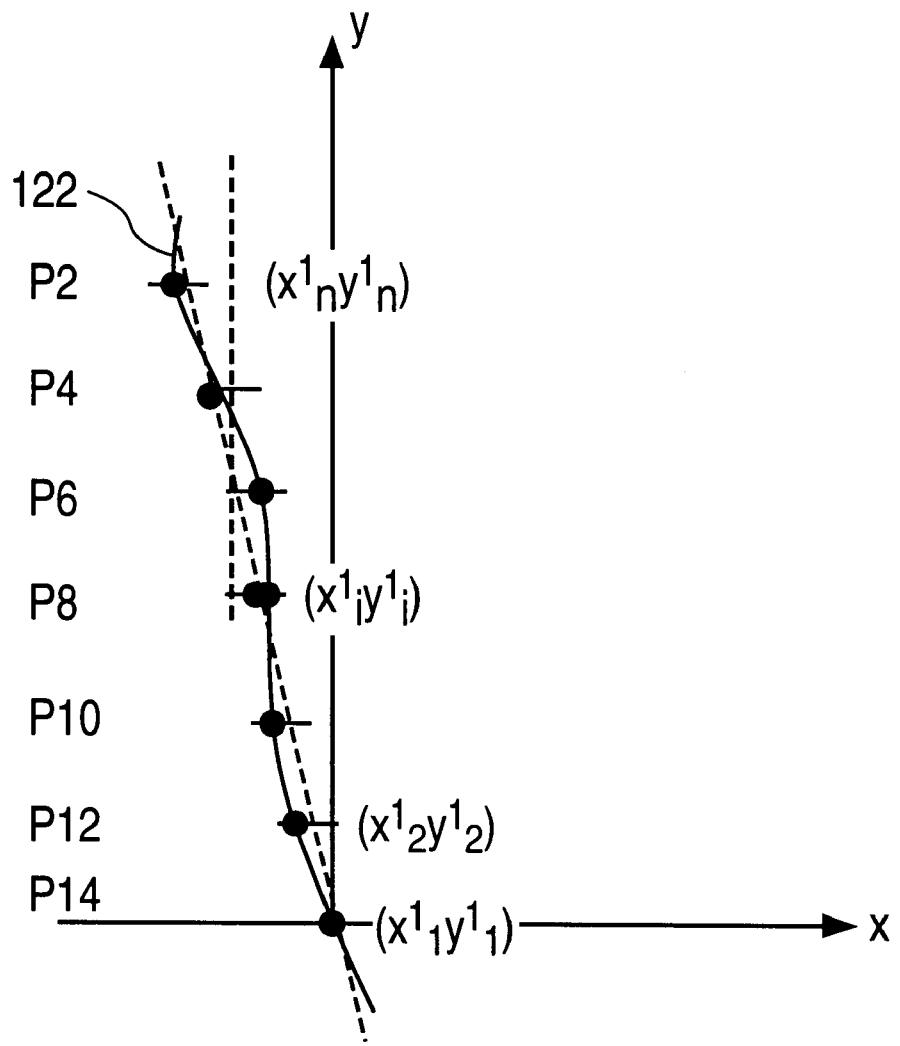
FIG. 23 illustrates a skewed line, intended to be vertical, printed by the same print cartridge that printed the line of FIG. 21 after being installed in a printer carriage.

In Step S206 of FIG. 19, the print cartridge is installed in the printer 10 of FIG. 1 or a similar printer, typically by the ultimate consumer. If the print cartridge was controlled with the same signals that produced the line 120 shown in FIG. 21, the result may be that shown by line 122 in FIG. 23. In FIG. 23, the wavering of the resulting line 122 is identical to that shown in FIG. 21, but the line 122 is skewed with respect to the y axis due to tilting of the print cartridge when installed in carriage 20.

In Step S208 of FIG. 19, a stored program in printer 10 or the host computer energizes all the primitives in a particular sequence to print a test pattern.

In Step S210 of FIG. 19, the x,y positions of the dots printed by the various primitives are determined using a line sensor in printer 10, previously described with respect to FIGS. 11 and 12.

Figure 24:
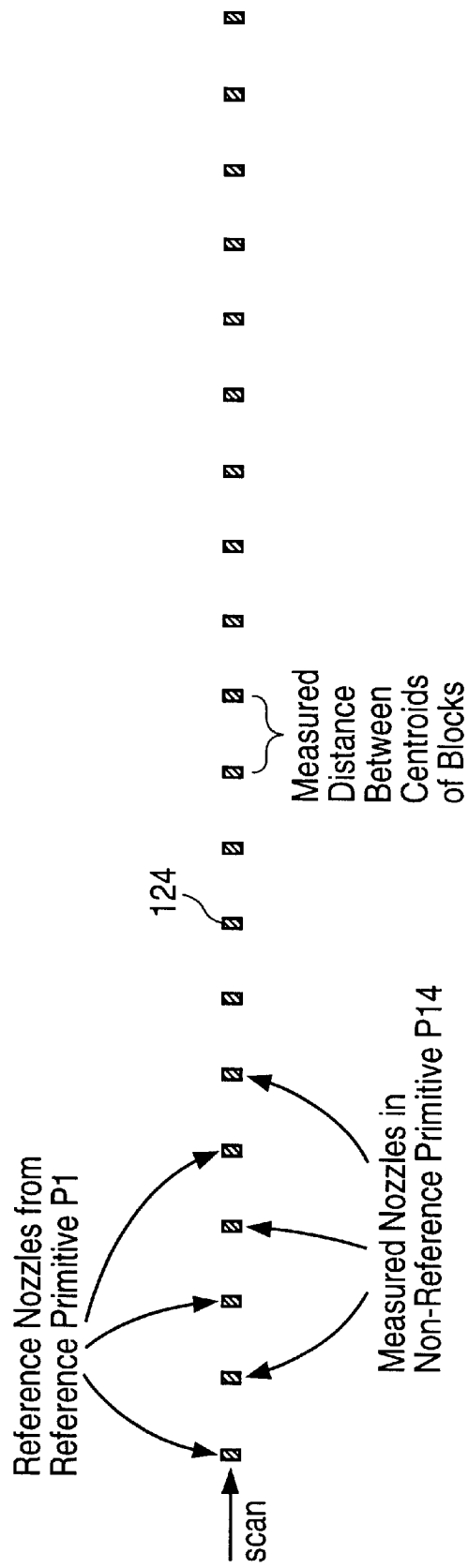
FIG. 24 illustrates a test pattern for a single alignment primitive (or odd/even pair) optically sensed by the printer line sensor for determining the alignment of printed matter.

FIG. 24 shows a simple pattern printed by one or more printheads in the printer for detecting the alignment of one primitive or an odd/even pair of primitives. The pattern height is the height of one alignment group. As an example, it will be assumed that the reference primitive referred to in FIG. 24 is P1 (see FIG. 3) in a cyan pen, and the position of primitive P14 in a black pen (in the same carriage as the cyan pen) is being measured to detect the skew of the printhead. Primitives P1 and P14 alternately print blocks 124. Since primitive P1 is vertically displaced from primitive P14 in the printhead, the paper must be shifted to print the blocks along a single line. It will be assumed that the reference primitive P1 prints the odd blocks and primitive P14 prints the even blocks along the scan axis.

The middle of each block along the scan axis is calculated based on the signal from sensor 72 in FIG. 12. All primitives in all printheads in the scanning carriage are fired and measured relative to a reference primitive.

The calculations are made by the processor 74 (FIG. 11) executing firmware code that controls all other printer operations, so no additional hardware is needed.

In one embodiment, the even and odd primitives for each printhead are printed separately and their positions relative to a reference primitive are measured.

In another embodiment, the even and odd pairs of opposing primitives in each printhead are printed to overlap, and the position of the resulting block is determined relative to a reference block. By overlapping the odd and even primitives, we obtain more optical density in each block, and printhead shape is measured considering both columns. In this embodiment, since the separation between the opposing primitives is known from the manufacturing line sensor, the correction for each primitive in the pair can be obtained using a single measurement of the overlapping primitive blocks. The positional information identifying the separation of the opposing pairs of primitives stored in the print cartridge memory is used to apply a preliminary timing compensation to the primitive enabling signals so the printed even and odd primitive blocks precisely overlap. Detail of how the timing compensation is implemented is provided later. In this manner, the test pattern size and the calibration time can be reduced by about one-half. Also, by using the data from the manufacturing line sensor, more accurate corrections result.

FIG. 25 shows an example of the pattern printed after seven scans to measure the alignment of seven different primitives (P1–P7) to a reference primitive.

FIG. 26 illustrates an alternative pattern where, in a single print pass, all the primitives to be measured in a pen are fired to print vertical bars 126, and a reference vertical bar 128 is printed during the same pass by the reference pen. Seven scans, with a paper shift in between, are then used to optically scan the pattern by the optical detector of FIG. 11.

The odd-even approach discussed above has the main advantage that the current tool in the manufacturing line has more precision when measuring an odd-even pair of primitives. However, the number of patterns to be printed and scanned to fully align the printheads in the printer is higher when the odd-even method is used. Assuming we have four printheads, two columns per printhead and eight alignment groups per column, the number of patterns to print and measure (patterns as the one shown in FIG. 24) is determined as follows:

a) Odd-Even Distances Encoded in Print Cartridge Memory:
  Option 1) We can first print/measure seven patterns to align a column in a printhead (measure distance from a reference group to the rest of the groups in the same column).

To align the other column of the same pen, no extra patterns are required as data for calculating the alignment is in the memory.

This process needs to be repeated for each pen. So 7*4=28 patterns need to be printed. At the end, three extra measurements will be necessary to align pen to pen (i.e., once the pens print "perfect" vertical lines, it is necessary that each vertical line falls on top of a vertical line printed with another pen). So the total number of required patters is 28+3=31 patterns.

Option 2) Another option consists of first aligning the column of a printhead (reference printhead) as in option 1. So seven measurements are required. For the rest of the printheads, we can measure the distance from each alignment group to the correspond alignment group in the reference printhead. So eight measurements are required for each one of the three non-reference pens. This totals (8*3)+7=31 patterns. In this case, no extra pen to pen measurements are required as we are already correcting with respect to a referent pen.

b) Scan Axis Direction Shape Encoded in Memory:
  In the embodiment where rotational angle is measured, we need one measurement per pen to find the rotation angle introduced by the printer by measuring the distance from a top primitive to a bottom primitive. So four patterns are required to align the four printheads. Then three extra patterns are required for pen to pen corrections. In total, seven patterns. It can be seen that this method requires less measurements by the printer, so the time required by the alignment process each time a printhead is changed will be much shorter.

In another embodiment, instead of correcting the alignment of each primitive, only column to column alignment is corrected using a single alignment group per column. All primitives in the same column would receive the same correction. Using the manufacturing line sensor, only column to column distance needs to be stored in the print cartridge memory. Only pen to pen alignment would need to be measured by the printer.

The information from the manufacturing line sensor stored in the memory chip 87 (FIG. 13) is used in combination with the relative position data taken by the printer line sensor to create relative x,y position data for each of the primitives.

If the particular measurements taken complete the required relative positional data, the procedure in FIG. 19 can now skip to Step 9. However, in an embodiment where the manufacturing line sensor detects the relative positions of all the primitives, the printer line sensor need only detect the rotation angles of the printheads to derive the relative positions of all the primitives in the printer. For this embodiment, Steps 7 and 8 are used.

In Step S212 of FIG. 19, the difference between the relative x,y position of, for example, primitive P2 stored in the memory chip 87 (FIG. 13) and its relative x,y position when printed by printer 10 is determined. The rotation angle of the printhead is then determined using the following approach.

Being (x,y) the coordinate system of the manufacturing line measurement, and ($x^1,y^1$) the rotated system of coordinates once the printhead has been inserted in the printer, then the transformation from one coordinate system to the other is defined as follows:

$$\begin{Bmatrix} x^1 \\ y^1 \end{Bmatrix} = \begin{bmatrix} \cos\theta & -\sin\theta \\ \sin\theta & \cos\theta \end{bmatrix} \cdot \begin{Bmatrix} x \\ y \end{Bmatrix}$$

So angle θ can be obtained as:

$$X_N^1 = X_N \cos\theta - y_N \sin\theta$$

As the rotation angle is small, we can approximate:

$$\cos\theta \approx 1$$
$$\tan\theta \approx \theta$$
$$\sin\theta \approx \theta$$

And so:

$$\theta = \frac{(x_N - x_N^1)}{y_N}$$

In Step S214 of FIG. 19, the x,y position information stored in the memory chip 62 on the print cartridge is then translated to the rotated $x^1,y^1$ positions using the transformation matrix. Since both columns of primitives have the same rotation angle, the same transformation matrix can be used to calculate new coordinates for both columns of primitives.

After the translation, the actual relative position associated with each primitive is known.

In Step S216, these actual relative positions are compared to the ideal relative positions for a perfect vertical line with no skew or wavering to identify positional errors associated with each primitive in the direction of scanning (i.e., perpendicular to the y axis in FIG. 23).

In Step S218, each position error is associated with a time delay or time advance needed for each primitive select pulse to compensate for the position error as the printhead scans across the medium. The time delay for a primitive is calculated based upon the time it takes for the scanning printhead to scan through the position error. An increased time delay for a primitive select pulse will cause the line segment printed by that primitive to be printed farther to the right as the printhead scans to the right. In one embodiment, the timing delays are in increments of quarter dot shifts (0, ¼, 2/4, ¾). The resolution of the printhead may be 600 dpi.

As previously described with respect to the method of FIG. 9, whole dot column shifts may be used to advance or delay a primitive select pulse in combination with a quarter dot delay shift. The previous discussion of storing the time delay or advance also applies to the method of FIG. 19.

In Step S220 of FIG. 19, the time correction for each primitive is stored in a non-volatile memory. Such a non-volatile memory may be in the printer 10 itself, in the print cartridge memory chip 87, or in an ASIC on the print cartridge or carriage.

There are several ways to store the information used to cause the dot advance or delay. We can store the absolute distance from each measured primitive to the reference primitive, or we can store the distance from each measured primitive to the previous measured primitive. Other options are numerous. Any option would provide the same information but it is desirable to minimize memory usage. Details on storing the corrections have been previously described. This information is used by the print engine to delay or advance the dot data as previously described.

The embodiments described above align the centroids of the primitives; however, the addressing signals for each nozzle may also be compensated to align the individual nozzles.

If a print cartridge in the carriage is replaced, new time corrections must be generated for the print cartridge.

Expressly described above are two different methods using a manufacturing line sensor for correcting the timing of the firing signals for the nozzles in one or more printheads. In one embodiment, the manufacturing line sensor determines the x,y positions of all the primitives (or individual nozzles) relative to a reference primitive (or reference nozzle). The printer line sensor then prints dots from a reference primitive and another primitive and measures the relative position of the primitive. This relative position is compared to the initial position measured on the manufacturing line. A rotational angle is then calculated, and the initial relative positions of the primitives are translated into the rotated positions. These actual positions are then used to calculate positional errors, which are easily converted to timing compensations along the scan direction for each primitive or for each nozzle.

In the other embodiment, some position data is taken on the manufacturing line, such as the distances between opposing primitives, and additional positional data is taken using the printer line sensor to generate, using both the manufacturing line data and printer data, a full set of relative position data. Timing corrections may then be calculated using this information. This technique, as the previous technique, reduces the time needed for the printer quality testing and results in more accurate test data.

The results of the quality testing at any stage may be stored in the memory on the print cartridge.

The invention may be used for any type of printhead. The printhead may be a thermal type or other type, such as those using piezoelectric elements. Inkjet and non-inkjet printers may benefit from this technique.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A printing compensation method for a printer incorporating at least one printhead which scans across a medium in a scan direction while printing dots on said medium, said at least one printhead having a column of ink ejection elements arranged generally perpendicular to said scan direction, said method comprising:

energizing said ink ejection elements to print a first test pattern prior to said printhead being installed in said printer;

detecting said first test pattern;

generating first positional data for at least some of said ink ejection elements based on said first test pattern;

storing said first positional data in a memory for said printhead;

energizing said ink ejection elements to print a second test pattern after said printhead is installed in said printer;

detecting said second test pattern;

generating second positional data for at least some of said ink ejection elements based on said second pattern;

calculating third positional data for at least some of said ink ejection elements based on said first positional data and said second positional data;

generating information for energizing signal timing corrections for at least some of said ink ejection elements to correct for any misalignment between printed matter printed by said ink ejection elements while said printhead is installed in said printer;

storing information to generate said timing corrections for said ink ejection elements; and time-correcting energization signals to said ink ejection elements, as appropriate, by said timing corrections while said printhead is printing across said medium, wherein said ink ejection elements are divided into groups, all ink ejection elements within a group receive a common enabling pulse, and wherein said timing corrections comprise a single timing correction for each group.

2. The method of claim 1 wherein generating said first positional data comprises detecting relative positions of printed matter by said groups of ink ejection elements.

3. The method of claim 1 wherein said printhead contains two parallel columns of ink ejection elements, and wherein generating said first positional data comprises generating data conveying distances between matter printed by opposite groups of ink ejection elements in said parallel columns.

4. The method of claim 1 wherein generating said first positional data comprises generating data conveying a distance of matter printed by each of said groups of ink ejection elements to matter printed by a reference group.

* * * * *